United States Patent [19]
Tzeng et al.

[11] Patent Number: 5,813,176
[45] Date of Patent: Sep. 29, 1998

[54] ASPHALTIC FOAM

[75] Inventors: Casey G. Tzeng, Irvine; George F. Thagard, III, Coto De Caza, both of Calif.

[73] Assignee: Fontana Paper Mills, Inc., Fontana, Calif.

[21] Appl. No.: 486,390

[22] Filed: Jun. 7, 1995

[51] Int. Cl.⁶ .................................................... E04B 7/00
[52] U.S. Cl. .................................. 52/198; 52/57; 52/199
[58] Field of Search ............................... 52/57, 198, 199; 454/365

[56] References Cited

U.S. PATENT DOCUMENTS

| | | | |
|---|---|---|---|
| 4,015,374 | 4/1977 | Epstein et al. | 52/57 |
| 4,225,678 | 9/1980 | Roy . | |
| 4,899,505 | 2/1990 | Williamson et al. | 52/199 |
| 4,907,499 | 3/1990 | James | 52/57 X |
| 4,962,692 | 10/1990 | Shuert | 454/365 |
| 5,174,076 | 12/1992 | Schiedegger et al. | 52/57 X |
| 5,232,530 | 8/1993 | Malmquist et al. . | |
| 5,295,340 | 3/1994 | Collins . | |
| 5,305,569 | 4/1994 | Malmquist et al. . | |
| 5,458,538 | 10/1995 | MacLeod et al. | 52/57 X |

FOREIGN PATENT DOCUMENTS

| | | |
|---|---|---|
| 51-64489 | 6/1976 | Japan . |
| 52-68125 | 6/1977 | Japan . |
| 57-95392 | 6/1982 | Japan . |

OTHER PUBLICATIONS

"Standard Test Method for Penetration of Bituminous Materials", *ASTM*, Designation: D 5, pp. 4–8, 1983.
"Standard Test Method for Softening Point of Bitumen (Ring–and–Ball Apparatus)", *ASTM*, Designation: D 36, pp. 12–15, 1976.
"Hydrogen Donors", Chapter 3, *The Development and Use of Polyurethane Products*, pp. 44–51.
"Roofing Bitumen Asphalt and Coal Tar Pitch", Chapter 14, Laaly—*The Science and Technology of Traditional and Modern Roofing Systems*, pp. 14–9 through 14–12 and 25–8.
*Encyclopedia of Chemical Technology*, 2nd ed., vol. 2, pp. 784–793, John Wiley & Sons, Inc., pub. 1963.
60617k "Foam composites for filling enclosed spaces", Rubens, *Chemical Abstracts*, Chapter 37–Plastics Fabr., Uses, vol. 76, p. 43, 1972, (corresponding to U.S. 3,616,172, Oct. 26, 1971).
91: 158592h "Water–resistant polyurethane foams", Murata, et al., *Chemical Abstracts*, vol. 91, 1979 (corresponding to Japanese 79 77,697, Jun. 21, 1979).
92: 149869x "Asphalt, bitumen, tar, or pitch foam material", Troxler, *Chemical Abstracts*, Chapter 51–Fossil Fuels, vol. 92, p. 189, 1980 (corresponding to German 2,823,388, Dec. 13, 1979).
100: 176641g "Asphalt foam sealants", (no inventor name listed) Toyo Rubber Chemical Industry Co., Ltd., *Chemical Abstracts*, Chapter 42–Coatings, vol. 100, p. 95, 1984 (corresponding to Japanese 59 15,433, Jan. 26, 1984).

(List continued on next page.)

*Primary Examiner*—Christopher Kent
*Attorney, Agent, or Firm*—Knobbe, Martens, Olson & Bear, LLP

[57] ABSTRACT

A ridge cap has an upper surface and a lower surface which is adapted to be placed in contact with a roof of a building. The ridge cap also includes a longitudinal axis having a front end and a back end, as well as two sides located axially distal of the longitudinal axis. A central channel along the longitudinal axis is located in the lower surface. A protuding member extends from a surface of the central channel. Another surface of the central channel includes a notch adapted to receive the protuding member. The protuding member and the notch are adapted to cooperate so as to at least substantially block the central channel when the ridge cap is bent and a distal end of the protruding member is made to enter into the notch.

16 Claims, 12 Drawing Sheets

OTHER PUBLICATIONS

103: 179420g "Asphalt foams", Kumasaka, et al., *Chemical Abstracts,* Chapter 38–Plastics Fabr., Uses, vol. 103, p. 57, 1985 (corresponding to Japanese 60 135,438, Jul. 18, 1985).

103: 106014t "Lightweight asphalt foams", (no inventor name listed) Toyo Rubber Chemical Industry Co., Ltd., *Chemical Abstracts,* Chapter 38–Plastics Fabr., Uses, vol. 103, p. 53, 1985 (corresponding to Japanese 60 96,616, May 30, 1985).

105: 192587c "Manufacture of plastic foams containing asphalt", Kumasaka, et al., *Chemical Abstracts,* Chapter on Plastics Fabr., Uses, vol. 105, 1986 (corresponding to Japanese 61 152,741, Jul. 11, 1986).

105: 192588d "Manufacture of plastic foams containing asphalt", Kumasaka, et al., *Chemical Abstracts,* Chapter on Plastics Fabr., Uses, vol. 105, 1986 (corresponding to Japanese 61 152,743, Jul. 11, 1986).

105: 192589e "Plastic foams containing asphalt", Kumasaka, et al., *Chemical Abstracts,* Chapter on Plastics Fabr., Uses, vol. 105, 1986 (corresponding to Japanese 61 152,741, Jul. 11, 1986).

105: 192590y "Manufacture of plastic foams containing asphalt", Kumasaka, et al., *Chemical Abstracts,* Chapter 38–Plastics Fabr., Uses, vol. 105, p. 73, 1986 (corresponding to Japanese 61 152,744, July 11, 1986).

106: 197621q "Vibration damping materials", Kurashige, et al., *Chemical Abstracts,* Chapter on Plastics Fabr., Uses, vol. 106, 1986 (corresponding to Japanese 61 261,040, Nov. 19, 1986).

107: 177684e "Cellular asphalt", Kumasaka, et al., *Chemical Abstracts,* Chapter 38–Plastics Fabr., Uses, vol. 107, p. 82, 1987 (corresponding to Japanese 62 116,642, May 28, 1987).

107: 177685f "Cellular Asphalt", Kumasaka, et al., *Chemical Abstracts,* Chapter 38–Plastics Fabr., Uses, vol. 107, pp. 82–83, 1987 (corresponding to Japanese 62 116,641, May 28, 1987).

108: 222931s "Process for producing asphalt–blended polyurethane foams", Ako, et al., *Chemical Abstracts,* Chapter 39–Elastomers, vol. 108, p. 55, 1988 (corresponding to British GB 2,192,635, Jan. 20, 1988).

114: 44076f "A novel asphalt–blended polyurethane foam", Ako, et al., from *Proc. SPI Annu. Tech., Mark., Conf.* (1989), *Chemical Abstracts.*

100: 214403x "Polyurethane–based sound–insulating structures for automobiles", Yokoyama, et al., *Chemical Abstracts,* Chapter 38–Plastics Fab., Uses, vol. 110, 1989 (corresponding to Japanese 63 270,261, Nov. 8, 1988).

88: 192143k "Polyurethane foams waterproofed with asphalts", Kusakawa, et al., *Chemical Abstracts,* vol. 88, p. 192142, 1978 (corresponding to Japanese 77 151,395, Dec. 15, 1977).

91: 158547x "Polyurethane foam containing asphalt and an oily hydroxylated glyceride", Thagard, *Chemical Abstracts,* Chapter 36–Plastics Manuf., vol. 91, p. 158446, 1979 (corresponding to Belgian 874,524, Jun. 18, 1979).

93: 221488n "Foamed polyurethane materials with a bitumen and a hydroxy fatty oil", Roy, et al., *Chemical Abstracts,* vol. 93, pp. 221487–221488, 1980 (corresponding to U.S. 4,225,678, Sep. 30, 1980).

91: 22201x "Foams with good sound absorption and anti–vibration property", Murata, et al., *Chemical Abstracts,* vol. 91, p. 22197, 1979 (corresponding to Japanese 79 03,199, Jan. 11, 1979).

100: 140321p "Asphalt foams", (no inventor name listed) Toyo Rubber Chemical Industry Co., Ltd., *Chemical Abstracts,* Chapter 37–Plastics Manuf., vol. 100, p. 140330, 1984 (corresponding to Japanese 58 213,029, Dec. 10, 1983).

102764j "Expanded rigid polyurethane", (no inventor name listed) Manufacturas Jose Jover, S.A., *Chemical Abstracts,* Chapter 36–Plastics Manuf., vol. 77, p. 102772, 1972 (corresponding to Spanish 375,769, Apr. 16, 1972).

97: 24735x "Asphalt–containing polyurethane foams", (no inventor name listed) NHK Spring Co., Ltd, *Chemical Abstracts,* vol. 97, p. 38, 1982 (corresponding to Japanese 82 47,336, Mar. 18, 1982).

93: 205803f "Thermally insulating building materials", Marusho, Japanese 80 21,144, Apr. 15, 1977.

104: 23479t "Asphalt foams useful for building materials", (no inventor name listed) Human Industry Corp. *Chemical Abstracts,* Chapter 58–Cement, Concrete, vol. 104, p. 251, 1986 (corresponding to Japanese 60 120,730, Jun. 28, 1985).

91: 141870z "Polyurethane foams", Maruyama, et al., *Chemical Abstracts,* vol. 91, p. 44, 1979 (corresponding to Japanese 79 77,695, Jun. 21, 1979).

90: 7299w "Stable foam material based on hydrocarbon binder", Smadja, *Chemical Abstracts,* Chapter 37–Plastics Fabr., Uses, vol. 90, p. 43, 1979 (corresponding to French 2,370,075, Jun. 2, 1978).

91: 142024p "Polyurethane foams", Kusakawa, et al., *Chemical Abstracts,* Chapter 39–Textiles, vol. 91, p. 55, 1979 (corresponding to Japanese 79 77,696, Jun. 21, 1979).

107: 218892s "Manufacture of asphalt foams by one–shot method", Kumasaka, et al., *Chemical Abstracts,* vol. 107, p. 58, 1987 (corresponding to Japanese 62 116,643, May 282, 1987).

108: 76723g "Asphalt foams", Kumasaka, et al., *Chemical Abstracts,* Chapter 38–Plastics Fabr., Uses, vol. 108, p. 61, 1988 (corresponding to Japanese 62 172,039, Jul. 29, 1987).

Brochure entitled "Air Vent Products . . . The Best Vents for All Homes" from Air Vent, Inc., Peoria Heights, IL (1993) in 3 pages.

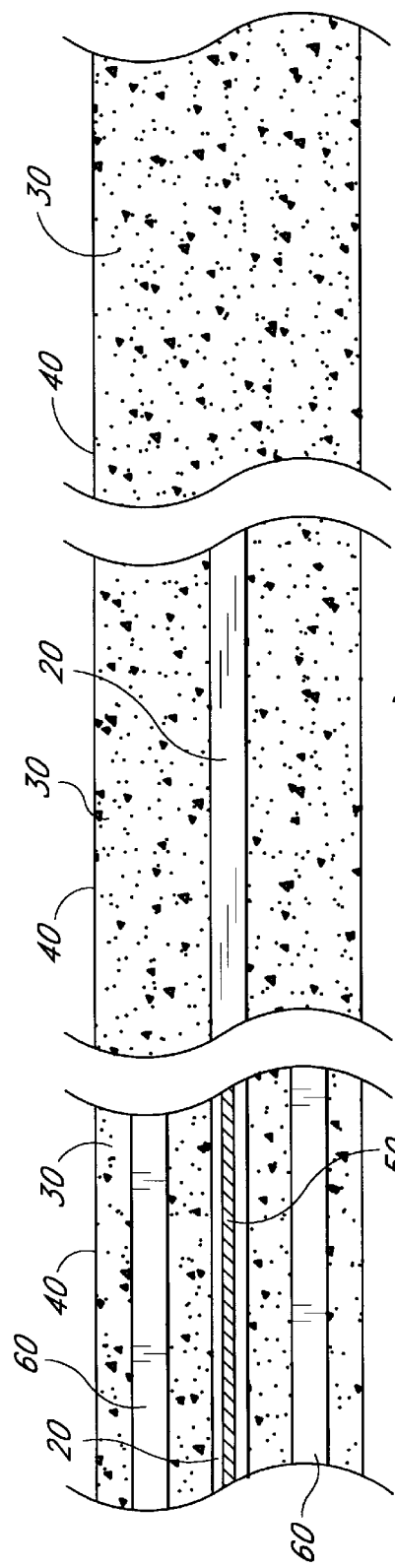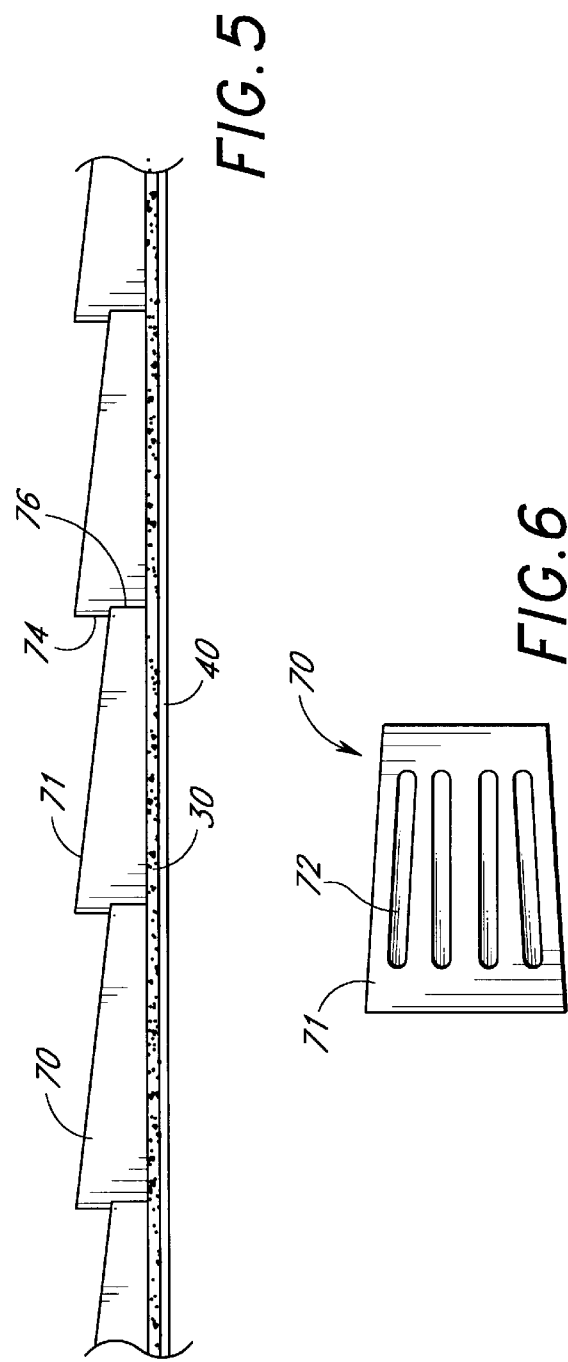

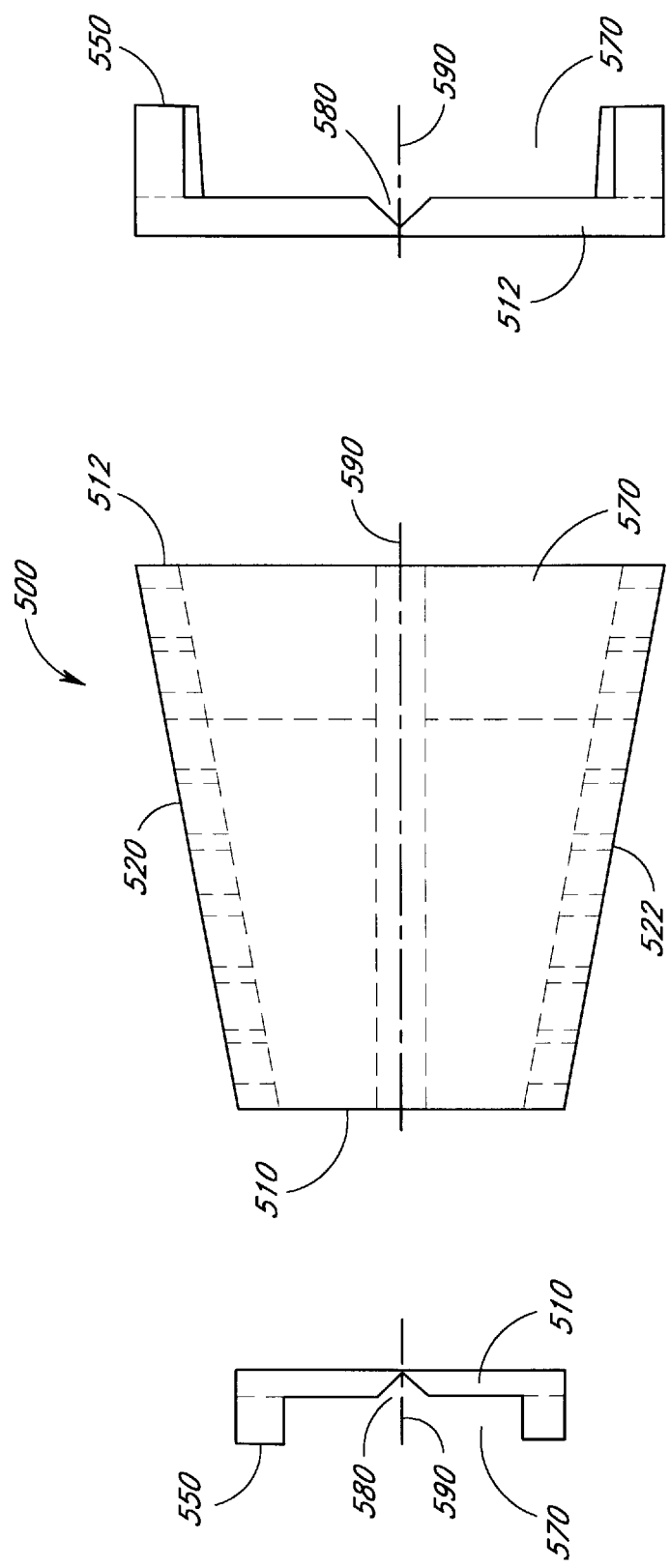

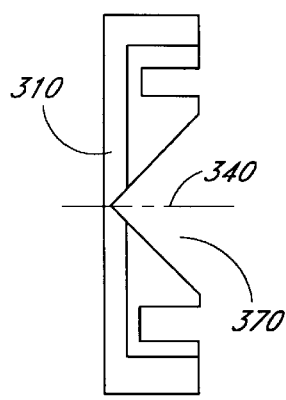
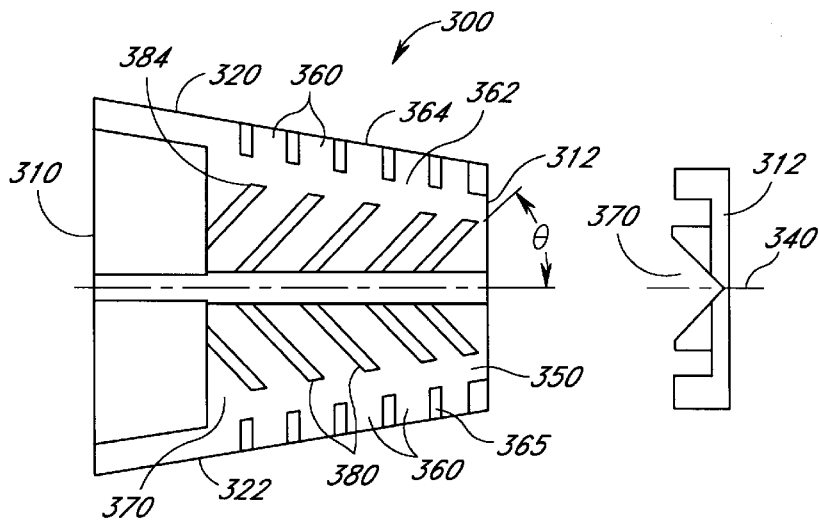
FIG. 11d    FIG. 11a    FIG. 11e
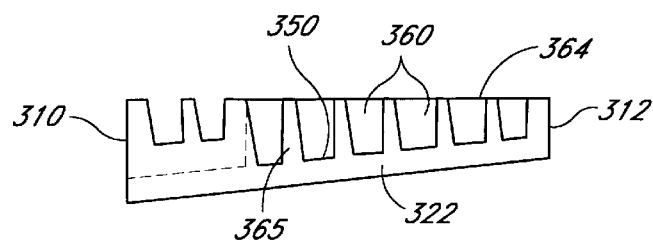
FIG. 11b
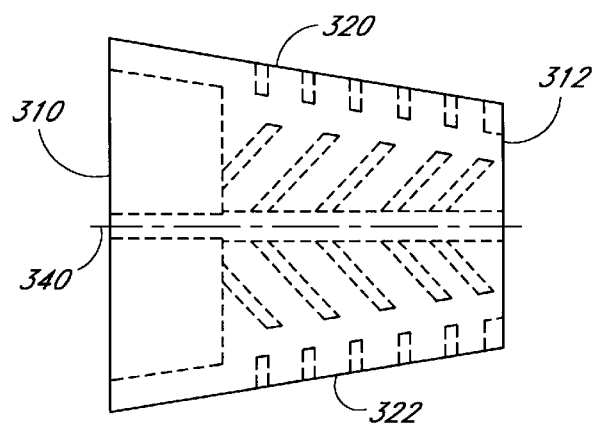
FIG. 11c

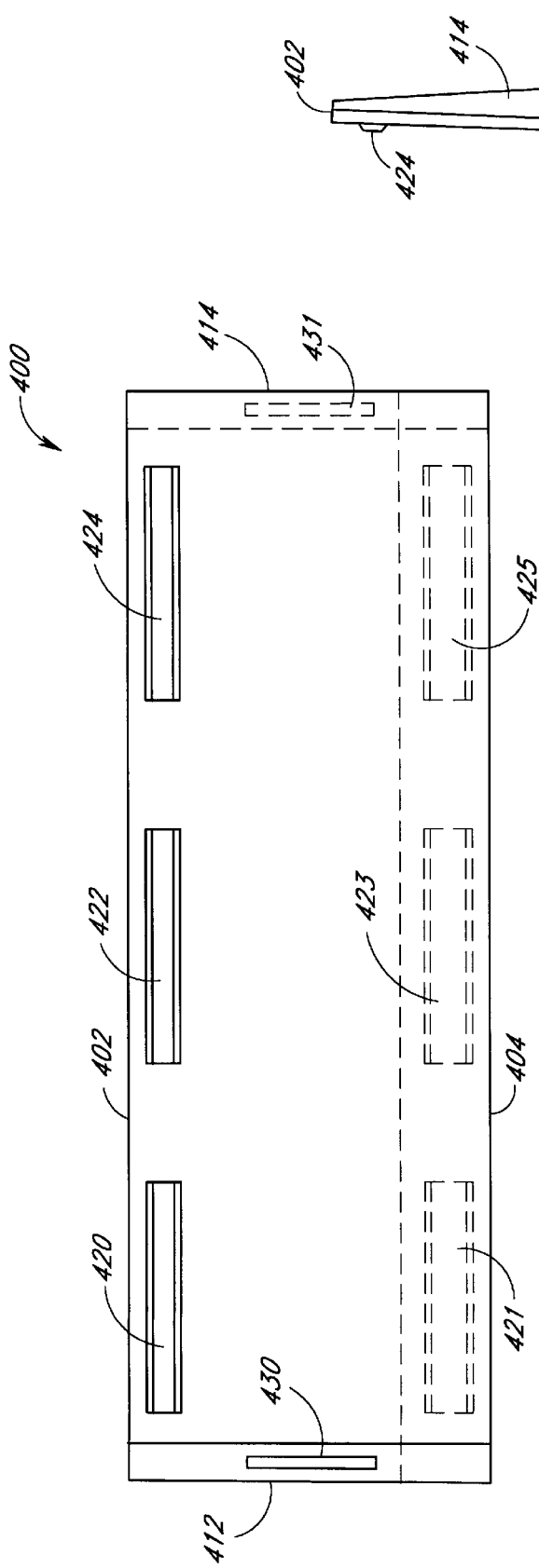
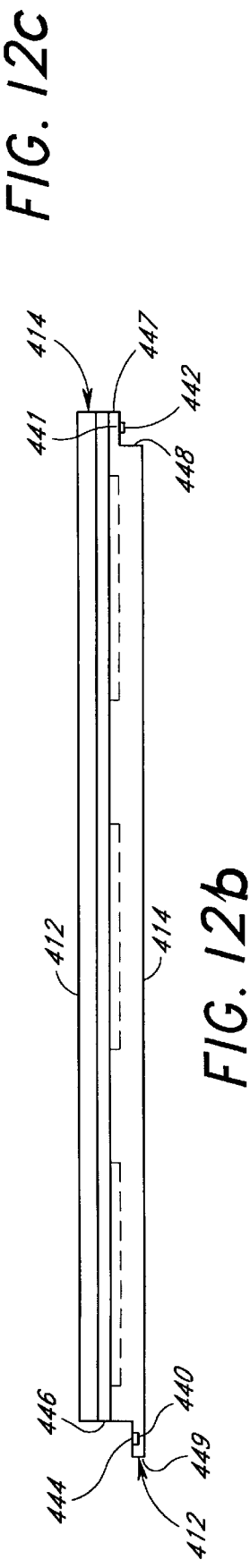

ASPHALTIC FOAM

FIELD OF THE INVENTION

The present invention relates to asphaltic foams which are useful in roofing and in other applications.

BACKGROUND OF THE INVENTION

1. Asphaltic Foams

Many attempts have been made to incorporate asphalt into polyurethane foams. Primarily, asphalt has been used as a filler material for such foams, due to the fact that it is less expensive than the precursor chemicals used to produce polyurethane foam. For example, in Spanish Patent Application No. 375,769, a process is described in which asphalt powder is added to a polyurethane precursor mixture as a filler material. The asphalt powder and polyurethane form a uniformly distributed plastic mass.

The addition of asphalt to a polyurethane foam can also, however, impart certain desired characteristics to the foam. In Japanese Patent Application No. 76/64,489, for example, a polyurethane foam was waterproofed through the addition of asphalt to the polyurethane precursors. Another asphalt-polyurethane mixture having good sound absorption and antivibration properties is disclosed in Japanese Patent Application No. 77/68,125.

Most prior art processes for incorporating asphalt into polyurethane, such as Japanese Patent Application No. 76/64,489, have made use of soft asphalts with low softening points. Such asphalts can be liquified and blended with polyols at relatively low temperatures to form a uniform, liquid mixture of asphalt and polyols. By completely blending the liquified asphalt with the polyols, a uniform asphalt-polyurethane foam product can then be produced. In addition, because low softening point asphalt remains liquid at relatively low temperatures, the asphalt-polyol mixture can be reacted to form a foam at temperatures which are low enough that a controlled reaction can take place. However, such foam products generally have a relatively low asphalt content.

In Japanese Patent Application No. 76/64,489, for example, a soft asphalt having a needle penetration degree of 80 to 100 is used. This asphalt has a correspondingly low softening point of under 150 degrees. In the process of this patent, the asphalt is mixed with polyurethane precursors, and this mixture is then reacted to form a compressible product, i.e. a soft foam.

The use of such soft asphalts in prior art processes is acceptable when it is desirable for the resulting product to be a soft foam. However, in certain applications, a rigid asphaltic polyurethane foam would be advantageous. A process for making a rigid asphaltic polyurethane foam is disclosed, for example, in U.S. Pat. No. 4,225,678 to Roy. In this process, relatively high molar ratios of isocyanate to polyols are recommended, in some cases as high as 11:1. The Roy process therefore resulted in products which were too friable and/or which lacked sufficient compressive strength. When conventional roofing asphalt having a softening point of over 200° F. was used in the Roy process to produce asphaltic foams, the foaming reaction also was too fast, making manufacturing of asphaltic foams impracticable.

2. Asphalt in the Roofing Industry

Various asphalt-coated or asphalt-impregnated materials are in common use in the roofing industry. For example, water absorbent paper which has been saturated with low softening point asphalt, known as saturated felt, is usually placed underneath other roofing components. The asphalt of the saturated felt provides the felt with secondary water repellency.

Higher softening point asphalt is put on either side of saturated felt to form base sheets, which go under the tiles of a roof to build up the roof system. Base sheets with mineral surfacing on their upper surfaces, known as mineral surface rolls, provide enhanced durability and fire retardancy to a roof and can also enhance a roof's appearance. Mineral surface rolls have been used as ridge caps, the largely ornamental structures which straddle the peak of a roof.

However, asphalt-impregnated papers suffer from various drawbacks. When used as ridge caps, for example, mineral surface rolls must be bent to fit the ridge-line of a roof. Mineral surface rolls are also sometimes bent to make them thicker and give a ridge line a layered appearance. Bending a mineral surface roll causes the asphalt and substrate to crack, however, leaving the cracked material exposed to the elements. The mineral surface roll tends to deteriorate at the site of such cracks within 3 to 4 years of being installed or even sooner, resulting in leaks and other roof damage.

Alternative materials, such as rubberized asphalt with a flexible polyester substrate, have also been used in the roofing industry. For example, modified asphalt has been used in mineral rolls to avoid cracking the asphalt and its substrate.

3. Polyurethane Foam in Shingles and Ridge Caps

One method for combining a polyurethane foam and an asphaltic material in roofing applications is suggested in U.S. Pat. Nos. 5,232,530 and 5,305,569 to Malmquist, et al. These patents teach that a polyurethane foam can be attached to the underside of an asphaltic material in order to produce a roofing shingle. Of course, this involves the manufacturing step of physically attaching the foam to the asphaltic material or otherwise forming the foam on the asphaltic material. The polyurethane foam and asphaltic material layers can, in addition, become delaminated.

As can be seen from the foregoing, there remains a need for improved asphalt-containing roofing materials, particularly for use as ridge caps and shingles. In addition, there is a need for asphaltic foams having greater rigidity which are adapted for use in manufacturing foam articles. These and other needs are met by the asphaltic foams and foam products of the present invention, and by the methods described herein for producing these foam products.

SUMMARY OF THE INVENTION

According to the present invention, a rigid polyurethane foam which incorporates asphalt and which has unique properties can be produced. This asphaltic foam is rigid, relatively light-weight, dimensionally stable when exposed to the weather elements, and has good cell structure and compressive strength. Therefore, unlike prior art foams, the asphaltic foam of the present invention can be used in structural applications, such as roofing applications.

In one aspect, the present invention comprises a method of producing a rigid asphaltic foam, comprising the steps of:
 a) providing asphalt having a penetration range of between approximately 5–25 and a softening point of between approximately 120° F. and 200° F.;
 b) liquefying the asphalt;
 c) adding to the asphalt one or more polyols, thereby forming an intermediate mixture;
 d) bringing the temperature of the intermediate mixture to between approximately 140° F. and 220° F.;

e) adding a blowing agent to the intermediate mixture, thereby forming a foamable mixture; and f) mixing a polyisocyanate with the foamable mixture, thereby forming a final reaction mixture, the polyisocyanate being added to the foamable mixture in a molar ratio of polyisocyanate:polyol of between about 1.3:1 and about 1.1:1 or between about 2.0:1 and about 2.7:1, wherein said polyisocyanate and said foamable mixture react to form said asphaltic foam.

When the mixing step comprises adding polyisocyanate to said foamable mixture in a molar ratio of polyisocyanate:polyol of between about 2.0:1 and about 2.7:1, the present method preferably also comprises the step of adding a catalyst to the intermediate mixture. Preferably, the molar ratio of polyisocyanate:polyol is either about 1.1:1 or 2.5:1. Between approximately 8% and 10% (by weight of the polyol-asphalt mixture) of a catalyst such as DABCO® TMR-4 catalyst can be added.

In a preferred embodiment, the asphalt used in this methods has an asphaltene content of no more than about 30%. The polyol component is preferably added to the asphalt in an amount of between about 5% and about 100% by weight of the asphalt. It is also preferred that the one or more polyols have between 3 and 6 functionalities. The one or more polyols is preferably a mixture of different polyols, and more preferably comprises approximately equal amounts of 1) a first polyol, the first polyol having three hydroxy functionalities; 2) a second polyol having three hydroxy functionalities; and castor oil. In a preferred embodiment, the castor oil is added to the asphalt before the first and second polyols are added. The first polyol is preferably Voranol 270, and the second polyol is preferably Multranol 9138.

The foregoing method can additionally comprising the step of mixing modifier with the asphalt between steps (b) and (c), wherein the modifier is added in an amount of up to about 10% by weight of the intermediate mixture, more preferably in an amount of about 5% by weight of the intermediate mixture. The modifier is preferably polypropylene, more preferably atactic polypropylene, or Vistamer™.

The method in this aspect of the invention can also include a number of other steps. For example, a catalyst can be added to the intermediate mixture. A modified asphalt weight viscosity reducer can also be mixed into the intermediate mixture, preferably in an amount of approximately 4% by weight of the intermediate mixture. This viscosity reducer can be, in one embodiment, Viplex 5.

The blowing agent of the foregoing process is preferably water, which can be added in an amount of about 1–5% of the weight of the intermediate mixture, preferably in an amount of about 2% of the weight. In addition, the asphalt used in the process preferably comprises about 26.8% by weight asphaltene, about 8.8% by weight saturated hydrocarbons, about 30.5% polar components, and about 33.9% aromatic components. The polyisocyanate for this process is also preferably selected from the group consisting of Mondur E-489, PAPI 580, Rubinate HF-185, and Lupranate M70.

In another aspect, the present invention comprises a continuous process for making a roofing tile or ridge cap. This process comprises the steps of:

a) providing a conveyor belt;

b) applying a granule layer to the conveyor belt;

c) providing sides of a mold on the conveyor belt, the sides extending upward from the conveyor belt;

d) applying the final reaction mixture of claim 1 to the granule layer;

e) placing a top of the mold on the sides; and f) allowing the final reaction mixture to rise and cure, thereby forming the roofing tile or ridge cap.

In another aspect of the present invention, the invention comprises a ridge cap which has a lower surface, adapted to be placed in contact with a roof of a building, and an upper surface. This ridge cap further comprises a longitudinal axis, the axis having a front end and a back end, and at least two sides located axially distal of the longitudinal axis. The ridge cap in this aspect of the invention further comprises a plurality of vents, wherein the outlet ends of the vents are located in at least one of the two sides, and wherein each of the plurality of vents extends axially inward toward the central axis. In a preferred embodiment, the ridge cap includes a central channel in the lower surface located along the longitudinal axis. In this embodiment, at least one of the vents of the ridge cap further comprises a central channel opening, wherein the opening provides ventilation and communication between the central channel and the one of the vents.

In another preferred embodiment, the ridge cap of this aspect of the invention further comprises an intermediate chamber in the lower surface adjacent the central channel, wherein at least one of the vents of the ridge cap further comprises an intermediate chamber opening, the opening providing communication between the intermediate chamber and at least one of the vents. In this embodiment, the intermediate chamber further comprises one or more barriers, each of the barriers comprising a proximal end in adjacent to the central channel and a distal end adjacent to the intermediate chamber opening of each of the vents. In another preferred embodiment, each of the barriers comprises a wall extending from the lower surface of the ridge cap.

In a further embodiment, the ridge cap of this aspect of the invention, includes a protruding member which extends from a first surface of the central channel, and a second surface of the central channel comprises a notch adapted to receive the protruding member. The protruding member and notch are adapted to cooperate so as to at least substantially block the central channel when the ridge cap is bent and a distal end of the protruding member is made to enter into the notch. The protruding member and notch can be located at the back end of the ridge cap, as in the embodiment shown in FIG. 8, or they can be located intermediate the front end and the back end of the ridge cap, as shown in FIG. 9 (which also includes a protruding member and notch at the back end of the ridge cap). As seen in FIG. 9, the ridge cap of this embodiment can also comprise a second notch and a second protruding member. The second protruding member and second notch are likewise adapted to cooperate so as to at least substantially block the central channel when the ridge cap is bent and a distal end of the second protruding member is thereby made to enter into the second notch.

In one embodiment, at least one of the plurality of vents of the ridge cap of this aspect of the invention comprises a segment which extends at an angle with respect to another segment of the vent. This angle is preferably approximately 30°.

A further embodiment of the ridge cap of the present invention allows one ridge cap to interlock with an adjoining ridge cap. In this embodiment, the upper surface of the front end of a first ridge cap further comprises a raised member having a first surface. The lower surface of the back end of this ridge cap and an adjoining ridge cap comprise a cavity having a second surface. The first surface of the raised member of the first ridge cap is adapted to be able to contact or to be placed in proximity to the second surface of the cavity of the adjoining ridge cap, the raised member thereby cooperating with the cavity of the adjoining ridge cap to interconnect the first ridge cap with the adjoining ridge cap. In a preferred embodiment, modified asphalt is placed in contact with or adjacent to the first surface of the raised member. In this way, when the raised member and cavity are interlocked, the modified asphalt will seal the raised member and cavity together.

BRIEF DESCRIPTION OF THE DRAWINGS

FIGS. 4a–4c diagram part of the process for manufacturing the ridge cap of FIG. 1.

FIG. 5 is a side view of a conveyor belt with molds on it for forming the ridge cap of FIG. 1.

FIG. 6 is a top view of one of the molds shown in FIG. 3.

FIG. 10A is a top plan view of yet another alternative embodiment of a ridge cap according to the present invention.

FIG. 10D is a side view of the embodiment of the ridge cap shown in FIG. 10A, taken from side 510.

FIG. 10E is a side view of the embodiment of the ridge cap shown in FIG. 10A, taken from side 512.

FIG. 11A is a bottom plan view of a further alternative embodiment of a ridge cap according to the present invention.

FIG. 11B is a side view of the embodiment of the ridge cap shown in FIG. 11A taken from side 322.

FIG. 11C is a top plan view of the embodiment of the ridge cap shown in FIG. 11A.

FIG. 11D is a side view of the embodiment of the ridge cap shown in FIG. 11A taken from side 310.

FIG. 11E is a side view of the embodiment of the ridge cap shown in FIG. 11A taken from side 312.

FIG. 12A is a top plan view of an alternative embodiment of a roofing tile according to the present invention.

FIG. 12B is a side view of the embodiment of the roofing tile shown in FIG. 12A, taken from side 404.

FIG. 12C is a side view of the embodiment of the roofing tile shown in FIG. 12A, taken from side 414.

DETAILED DESCRIPTION OF PREFERRED EMBODIMENTS OF THE INVENTION

Figure 1:
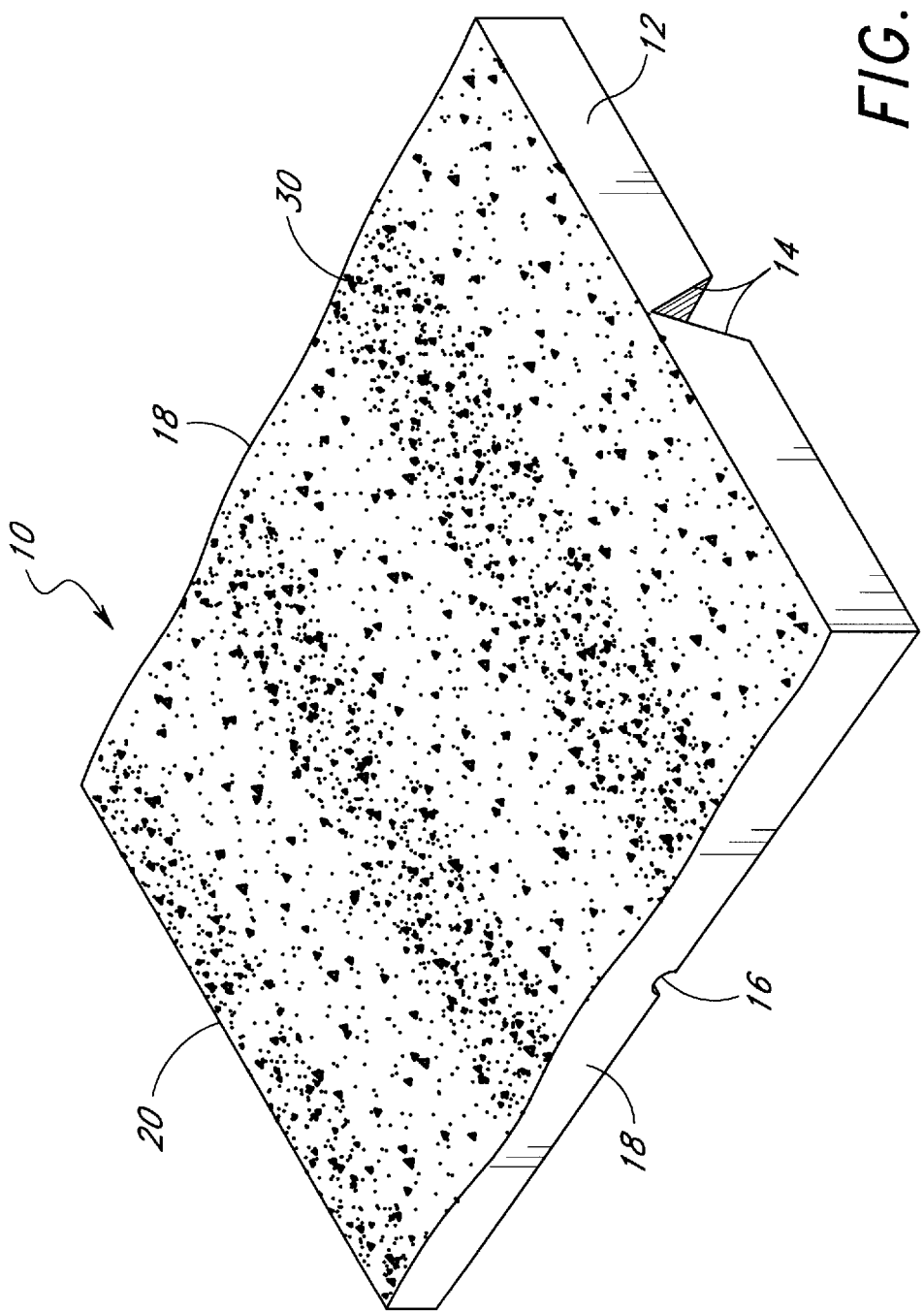
FIG. 1 illustrates a ridge cap made from the asphaltic foam material of the present invention.

Asphalt has long been used in waterproofing applications, particularly in the roofing industry. In the roofing industry, asphaltic materials are used due to their low cost, durability, and ability to withstand water and extremes of heat. Papers saturated or impregnated with asphalt, for example, are commonly used to cover roofs.

Asphaltic papers are not very well suited to some applications, however. They are relatively thin, and therefore do not impart the aesthetic qualities which thicker materials impart. In addition, when making ridge caps, asphaltic papers must be bent to fit the ridge line of the building. Because asphaltic papers are relatively inelastic, however, once bent they cannot retake their prior shape. During bending, the fibers of the paper as well as the asphalt itself is cracked and damaged.

There is therefore a need for an asphalt-containing material which can be used in structural applications and which has properties not heretofore found in other asphaltic materials.

I. Definitions

As used herein, the terms listed below shall be defined as follows, unless a contrary meaning is clear meant in context:

"Foaming reaction" shall mean the chemical reaction which occurs when a polyisocyanate is reacted with an asphalt-polyol mixture according to the process of the present invention to form an asphaltic polyurethane or isocyanurate foam.

"Modified asphalt" shall refer to asphalt which has been blended with polypropylene, particularly atactic polypropylene, or with other asphalt modifiers such as styrene-butydiene-styrene (SBS) or Vistamer™, a surface modified particulate rubber.

"Penetration" shall mean the hardness of a material, as measured by the resistance of the material to penetration by a needle mounted on a penetrometer. A penetrometer is a device which holds a needle with a 100 gram (±0.05 grams) load and moves vertically without measurable friction. To determine the penetration value of a material, the tip of the needle of a penetrometer is positioned on the surface of a material whose hardness is to be tested, and the needle is allowed to penetrate into the material for 5 (±0.1) seconds at 77° F. (25° C.). The amount of penetration is rated in terms of the length of the needle, measured in tenths of millimeters, which penetrated the material in those 5 seconds. A numeric value corresponding to amount of penetration, in tenths of millimeters, is then assigned as the penetration value of the material. This procedure follows the standard test method for the penetration of bituminous materials promulgated by the American Society for Testing and Materials (ASTM Designation D 5-83). Since a needle will pass through a softer material more rapidly than a harder material, higher penetration values correspond to softer materials.

"Reaction mixture" shall refer to any combination of reactants used in the process of the present invention prior to being reacted in a foaming reaction.

"Softening point" means the temperature at which asphalt attains a particular degree of softness. Asphalt does not have a definite melting point, but instead changes slowly from a harder to a softer material with increasing temperature. The softening point is determined by placing a steel ball (9.53 mm in diameter) on a mass of asphalt contained in a brass ring. The ring has a brass plate at the bottom in contact with the asphalt sample. The asphalt and ball are then heated in a water or glycerol bath until the ball drops to the plate, which is 25 mm under the ring. The temperature at which the ball drops to the plate is the softening point. This procedure follows the standard test method for the softening point of bitumen promulgated by the American Society for Testing and Materials (ASTM Designation D 36-76).

The foregoing definitions pertain as well to other grammatical forms derived from these terms, including plurals.

II. Improved Asphaltic Foam

A. Reactants

1. Asphalt

Asphalt is a solid or semisolid mixture of hydrocarbons and small amounts of non-hydrocarbon materials, occurring naturally or obtained through the distillation of coal or petroleum. Most of the hydrocarbons in asphalt are bituminous, meaning that they are soluble in carbon disulfide. As is known to those of skill in the art, asphalt is a complex, colloidal mixture containing a broad spectrum of different hydrocarbon components. These components can generally be broken down into three main categories: two solid components, the asphaltenes and asphaltic resins, and one liquid component, the oily constituents.

Asphaltenes generally comprise the highest molecular weight and most aromatic components of asphalt. Asphaltenes are defined as the components of asphalt which are soluble in carbon disulfide but insoluble in paraffin oil (paraffin naphtha) or in ether.

Broadly categorized, the asphaltic resins and oily constituents can be further separated into saturated components, aromatic components, and resins or polar components. The polar components are responsible to some degree for the viscosity of an asphalt.

In order to produce the unique asphaltic polyurethane or isocyanurate foam of the present invention, asphalt meeting certain specifications must be used in the process for manufacturing this foam. We have found that the hardness of the asphalt component of the foam contributes to the rigidity of the final foam product. Therefore, in order to give the final product sufficient rigidity, an asphalt having a penetration range of about 5 to about 25 should be chosen. Preferably, an asphalt having a penetration range of between about 8 and about 18 is used, and more preferably an asphalt having a penetration of about 12 is used.

The hardness of asphalt is, in turn, generally correlated to its asphaltene content, although the asphaltic resin components of asphalt will also contribute to an asphalt's hardness. The asphalt used to produce the foam of the present invention preferably has an asphaltene content in the range of about 20% to about 30% by weight, more preferably in the range of about 25% to about 28%. In a particularly preferred embodiment, the asphalt used in the present invention has an asphaltene content of about 27%.

The asphalt used to produce the present asphaltic foam must, in addition, be chosen so as to have a relatively low softening point. An asphalt having a softening point of about 120° F. to about 200° F. should be used. Preferably, an asphalt having a softening point of 125° F. to 150° F. is used, and more preferably an asphalt having a softening point of 135° F. is used. As is known to those of skill in the art, the softening point of asphalt is influenced by the resin or oil content of the asphalt.

A preferred asphalt for use in the present invention is a non-blown (i.e., not air-oxidized) asphalt obtained from Oxnard Refinery (California) having the following specifications: a softening point of greater than 110° F. and less than 150° F., and a penetration range of greater than 5 and less than 15. This asphalt is composed (in weight percentages) of approximately 26.8% asphaltene, 8.8% saturated hydrocarbons, 30.5% polar components, and 33.9% aromatic constituents. For example, Oxnard "D" grade asphalt meeting these specifications can be used.

In total, the asphalt component of the reactants used in the process of the present invention can comprise up to approximately 40% by weight of the final finished product. Asphalt can, however, make up between about 5% and about 55% of the finished product used in the present process.

The use of lower amounts of asphalt in the process of the present invention will not significantly affect the reaction of that process. However, using greater amounts of asphalt than this can lead to the reaction mixture becoming more viscous (in the absence of viscosity reducers), necessitating the use of higher reaction temperatures in order to blend the reaction mixture components. This in turn increases the reaction rate to a point which becomes hard to control during manufacturing.

Generally, the more asphalt used, the more economical the final product will be, since asphalt is generally less expensive than the other components of the present asphaltic foam. Asphalt does, however, require energy to heat it. Higher asphalt levels will also lead to higher viscosity in the reaction mixture, which may cause manufacturing difficulties.

In addition, the amount of asphalt used will affect the physical properties of the finished asphaltic foam product of the present invention. With a higher asphalt content, the foam tends to be softer and to have a higher density. More free asphalt can also be extracted from the foam at higher asphalt levels.

2. Asphalt Modifiers

When producing the asphaltic foam of the present invention, it is preferred, though not essential, to blend an asphalt modifier into the asphalt component of the reaction mixture. For example, the addition of polypropylene to the asphalt enhances the strength of the final foam product of the present process. Atactic polypropylene (APP) is particularly preferred because it blends well with the asphalt.

When polypropylene is used in the present process, it is blended into the asphalt component of the reaction mixture in an amount of up to 10% by weight of the asphalt. More preferably, polypropylene is added in an amount of between about 3% and about 8%, and more preferably still is used in an amount of about 5% by weight of the asphalt.

In order to blend the polypropylene into asphalt, the asphalt is first heated to about 400° F. The polypropylene is then dropped into the hot asphalt and blended in with a mechanical mixer. Atactic polypropylene typically has a melting point of over 350° F., and so will melt on exposure to the hot asphalt.

Other modifiers can also be used in the same way as APP to modify the characteristics of the asphalt and/or the characteristics of the final asphaltic foam product of the present invention. Such modifiers include isotactic polypropylene (IPP), styrene-butydiene-styrene (SBS), styrene-isoprene-styrene (SIS), ethylene-propylene (EPM), ethylene-propylene-diene (EPDM), ethylene-vinyl acetate (EVAc), ethylene-acrylic ester (EAC), ethylene copolymer bitumen (ECB), polyethylene (PE), polyethylene chlorosulfonate (CMS), polyvinylchloride (PVC), butyl rubber (IIR), polyisobutylene (PIB), and polychloroprene (CR). If the modifier used has a lower melting point than APP, the asphalt in that case only needs to be heated to a sufficient temperature to cause the modifier to melt and blend into the asphalt and to cause the asphalt to be sufficiently liquid so that other components can be mixed into the asphalt.

One modifier which has been found to be particularly useful is Vistamer™ (sold as Vistamer™ R or Vistamer™ RD, depending on the water content of the particles), which is a surface modified particulate rubber product made by Composite Particles, Inc. (2330 26th St. S. W., Allentown, Pa. 18103). Vistamer™ is a free-flowing black powder made from post-consumer tire materials. When added to the asphalt used in the present process in an amount of about 10% (by weight of the asphalt), Vistamer™ not only improves the viscosity of the asphalt and makes it easier to blend the asphalt with the polyol component of the process, it also increases the compressive strength of the final foam product by 10–15%. Smaller amounts of Vistamer™ can also be added, of course, and this modifier can also be used together with other modifiers, in amounts of up to about 10% total modifier (by weight of the asphalt). Due to the high melting point of Vistamer™, it is preferable to heat the asphalt to about 400° F. before adding the Vistamer™ to the asphalt.

3. Polyols

Polyols are one of the precursors necessary to form a polyurethane or isocyanurate foam. A polyol is a hydrogen donor having a plurality of hydroxy (—OH) functional groups ("functionalities"). Polyols also sometimes comprise other hydrogen donor moieties, such as —NH, —SH, and/or —COOH. NH groups are generally more reactive than OH groups, followed by SH and COOH groups in reactivity. Polyols comprised mainly of —OH hydrogen donors have been found to be preferred in the present process because they react quickly enough to be commercially feasible but not so quickly as to produce a foaming reaction which cannot be controlled.

In the foaming reaction of the present process, polyol hydroxy functional groups react with a molecule of isocyanate to form a polymer, either polyurethane or isocyanurate (depending on the proportion of isocyanate in the mixture, as discussed below). Several characteristics of the polyols influence their reactivity in foaming reactions as well as the nature of the foams produced by such reactions. One important characteristic of the polyols used in the process of the present invention is the number of functionalities the polyol has, that is, the number of hydroxy groups available to react in a foaming reaction. The number of functionalities on a polyol influences both the speed of the foaming reaction and the amount of cross-linking in the asphaltic foam product which results from the foaming reaction.

It is preferable to use a polyol having between 3 and 6 functionalities to produce the asphaltic foam of the present invention. More preferably, the polyol has more than three functionalities per polyol molecule. Alternatively, a mixture of polyols which, in aggregate, have an average of between about 3 and 6 functionalities (preferably more than 3) can be used in the present process. In the present process, the best results have, in fact, been obtained when polyols used in the process comprise a mixture of approximately equal amounts by weight of the following three polyols:

(1) Voranol 270 (made by Dow Chemical Company, Urethane Dept., Midland, Mich. 48674), which has an average of 3 functionalities per molecule, a hydroxyl number (mg KOH/g) of 235, and a molecular weight of about 700;

(2) Multranol 9138 (made by Miles, Inc., Polymers Division, Mobay Road, Pittsburgh, Pa. 15205), which has on average 3 functionalities per molecule, a hydroxyl number of about 700, and a molecular weight of 240; and (3) castor oil (available as DB Oil from CASChem, Inc., 40 Avenue A, Bayonne, N.J. 07002), which has 2–3.5 functionalities per molecule, a hydroxyl number of 110–350, preferably a hydroxyl number of about 164, and a molecular weight of about 928.

When choosing polyols for use in the present process, it is preferred that the polyol or group of polyols have an aggregate molecular weight in the range of 200–1200, more preferably 300 to 900, and most preferably a molecular weight of about 620.

In general, a polyol having a higher number of functionalities will react more quickly in the foaming reaction than polyols with fewer functionalities. In addition, when the average number of functionalities in the polyols of the reaction mixture is higher, the foaming reaction also will tend to proceed more quickly.

In addition, the greater the number of functionalities there are present in the reaction mixture, the greater the amount of cross-linking which will occur in the final asphaltic foam product. Greater cross-linking will generally yield a more rigid product. However, too much cross-linking will yield a product that is brittle and friable. Thus, the number of functionalities in the polyols used in the process of the present invention should be restricted as described above.

There are several other factors to consider when choosing polyols for use in the present invention. The viscosity of a polyol, for example, is important. Less viscous polyols are generally preferred, since the asphalt component of the reaction mixture is itself highly viscous, and less viscous polyols can help to lessen the viscosity of the reaction mixture. Polyols with a lower equivalent weight are also preferred, since lesser amounts of such polyols can be reacted with an equal amount of the isocyanate component compared with polyols with higher equivalent weights.

A preferred mixture of polyols for use in the present invention has a viscosity, equivalent weight, and functionality number which is the same as or similar to that of a mixture of equal amounts of Multranol 9138, Voranol 270, and D13 castor oil.

Of course, other polyols besides those enumerated above are available commercially and can be used in the present process. Representative polyols which can be used according to the parameters outlined above include both polyester polyols and polyether polyols. Representative polyether polyols include poly (oxypropyrene) glycols, poly (oxypropylene-b-oxyethylene) glycols (block copolymers), poly (oxypropylene) adducts of glycerol, poly (oxypropylene) adducts of trimethylolpropane, poly (oxypropylene-b-oxyethylene) adducts of trimethylolpropane, poly (oxypropylene) adducts of 1,2,6-hexanetriol, poly (oxypropylene) adducts of pentaerythritol, poly (oxypropylene-b-oxyethylene) adducts of ethylenediamine (block copolymers), and poly (oxypropylene) adducts of sucrose methylglucoside, sorbitol. Representative polyester polyols include those prepared from the following monomers: adipic acid, phthalic anhydride, ethylene glycol, propylene glycol 1,3-butylene glycol, 1,4-butylene glycol, diethylene glycol, 1,2,6-hexanetriol, trimethylopropane and 1,1,1-trimethylolethane. Other polyols which can be used include N,N,N',N'-tetrakis (2-hydroxy-propyl)-ethylenediamine, which is commercially available under the trade name of "Quadrol" from BASF Wyandotte Corporation.

4. Viscosity Reducer

Although viscosity reducers are not essential to produce an asphaltic foam product according to the present invention, they are preferably added to the reaction mixture in the process of the present invention. Viscosity reducers help reduce the viscosity of the reaction mixture when the foaming reaction is performed. Without viscosity reducers, higher temperatures have to be applied to the mixture during the process, which can cause the reaction to proceed too violently. In general, the viscosity reducer is added after the polyol or polyol mixture used in the present process has been mixed with the asphalt.

One viscosity reducer which has been advantageously used in the process of the present invention is Viplex 5 (available from Crowley Chemical, 261 Madison Ave., N.Y., N.Y. 10016). Viplex 885 and Viplex 525 can also be used. When Viplex 5 is added to the reaction mixture as a viscosity reducer, it can be added in an amount of between about 2% and about 10% by weight, based on the weight of the polyol and asphalt together. More preferably, Viplex 5 is added in an amount of about 4% by weight. Other viscosity reducers, such as some plasticizers, can also be used in the present process in place of Viplex 5. Adding too much viscosity reducer should be avoided, however, as it tends to soften the asphalt and the resulting asphaltic foam product.

5. Blowing Agent

In order to produce an asphaltic foam product with a greater degree of foaming, compositions referred to as "blowing agents" can be added to the reaction mixture. When added to a reaction mixture, blowing agents are initially liquids. However, blowing agents become gaseous during the foaming reaction and expand in volume. Such expansion causes the now gaseous blowing agents to exert force against the polymerizing reactants, thereby forming bubbles or cells in the final foam product.

One blowing agent which can be used is water. When water is added to the reaction mixture, it reacts with the polyisocyanate in the mixture to give an amine or polyamine and also carbon dioxide. Since water is dispersed homogeneously in the mixture, the carbon dioxide gas is evolved throughout the cell structure. It is advantageous for such carbon dioxide to be formed during the foaming reaction, in order for the bubbles formed by the carbon dioxide to produce the cells characteristic of polyurethane and isocyanurate foams. Therefore, polyisocyanate and water should not be mixed together until the foaming reaction is begun.

When water is used as the sole blowing agent in the present process, it is added to the reaction mixture in an amount of between about 3% and about 6% by weight, and preferably in an amount of about 4% by weight, based on the weight of the polyols and asphalt together. If other blowing agents were added to the reaction mixture in addition to water, a correspondingly lesser amount of water would be added. Excess water should not be added, because the water is a reactant and will react with the isocyanate, thereby preventing the isocyanate-polyol reaction. The addition of too much water would prevent a foam cell structure from forming and would cause too much carbon dioxide to evolve.

Other blowing agents used to foam polyurethane or isocyanurate polymers generally operate by vaporizing at temperatures which are lower than that at which the foaming reaction takes place, rather than by reacting with any of the components of the reaction mixture. Such other blowing agents include halocarbons like trichlorofluoromethane, dichlorodifluoromethane, and methylene chloride, ethanol mixed with dibutylphthalate, and other volatile liquids or liquid mixtures. Because these blowing agents act by vaporizing, they are generally added, like water, just before the foaming reaction begins. However, we have found that under most circumstances it is not feasible to use such conventional physical blowing agents due to the temperature requirement of the asphalt-polyol mixture, which is highly viscous at lower temperatures.

6. Polyisocyanate

A number of polyisocyanates can be used to create the asphaltic foam of the present invention. These polyisocyanates, like the polyols, should have at least two and preferably three functionalities per polyisocyanate molecule.

In the process of the present invention, polyisocyanates are added to the reaction mixture in a particular stoichiometric molar ratio compared to the amount of polyol added. In order to form a polyurethane asphaltic foam, this ratio should be in the range of approximately 1.3:1 to 0.95:1 (polyisocyanate:polyol), and preferably about 1.1:1. In order to form an isocyanurate foam, though, the ratio should be in the range of approximately 2.0:1 to 2.5:1, and more preferably should be about 2.5:1.

If the polyisocyanate:polyol ratio is between 1.3:1 and 2.0:1, an asphaltic foam is also produced. However, the resulting foam will tend to be more brittle than the above-described polyurethane and isocyanurate foams.

In a preferred embodiment, a polyisocyanate molecule having about 3 NCO functionalities is used in the process of the present invention. This molecule is, preferably, a polymeric MDI-type molecule. Polymeric MDI is preferred due to its low toxicity and low vapor pressure at room temperature. Mondur E-489 (Miles, Inc.) is a polymeric MDI which has been found to produce a satisfactory asphaltic foam product. Other polyisocyanates which can be used include PAPI 580 (Dow), PAPI 901 (Dow), PAPI 27 (Dow), Mondur MR (Miles), Mondur 437 (Miles), Rubinate HF-185 (ICI), and LUPRANATE M70 (BASF).

7. Other Ingredients

A variety of other ingredients can be added to the reaction mixture in minor amounts according to the process of the present invention in order to impart certain desired characteristics to the final asphaltic foam product. For example, in order to assure an even cell structure in the foam material, a silicone surfactant such as Air Products DABCO-193 or DABCO-197 can be added during the blending of the polyol-asphalt mixture. If 4% of a surfactant (based on the weight of the polyol and asphalt together) is added to the reaction mixture, a foam having smaller, homogenous cells is obtained.

Plasticizers, such as dioctylphthalate, diisooctylphthalate, dibutylphthalate, diisobutylphthalate, dicaprylphthalate, diisodecylphthalate, tricresylphosphate, trioctylphosphate, diisooctyladipate, and diisodecyladipate, can also be used in the present process to make the reactants used in the process less viscous. Plasticizers in this application act as emulsifiers and as viscosity reducers.

In general, it is preferred not to add catalysts to speed the foaming reaction when producing a polyurethane foam. It has been found, for example, that catalysts such as triethylamine and triethanolamine cause a foaming reaction which is too rapid to be used in manufacturing polyurethane foam products. However, catalysts which speed the curing of the final foam product are advantageously used. Curing catalysts such as Air Products DABCO DC-2 or POLYCAT SA-1 can be added in amounts of 4% based on the total weight of the polyol and asphalt.

When producing isocyanurate foams, though, it is usually necessary to add a catalyst to the reaction mixture in order to make the foaming reaction sufficiently rapid to be commercially useful. Between approximately 8% and 10% (by weight of the polyol-asphalt mixture) of a catalyst such as DABCO® TMR-4 (available from Air Products and Chemicals, Inc., Box 538, Allentown, Pa. 18105) is added to the asphalt-polyol mixture prior to the commencement of the foaming reaction in order to produce a rapidly foaming isocyanurate foam product.

In addition, other additives such as flame retardants, fillers, and U.V. protectors can also be added to the reactant mixture in order to impart other desired characteristics to the asphaltic foam of the present invention without deleteriously effecting the rigidity and other physical properties which are achieved in the final foam product. For example, the flame retardant Antiblaze® 80 has been successfully incorporated into the asphaltic polyurethane foams of the present invention to increase the flame retardancy of the foam material. Antiblaze® 80 is a neutral, chlorinated phosphate ester which is available from Albright & Wilson, P.O. Box 26229, Richmond, Va. 23260. Flame retardants, if used, are preferably added to the reaction mixture prior to foaming in amounts of approximately 8% to 10% (by weight of the polyol-asphalt mixture). Smaller amounts of fire retardant can also be incorporated into the foams of the present invention, although the amount of fire retardancy imparted to such foams will of course be decreased.

B. Process Steps

To form the asphaltic foam of the present invention, the asphalt described above is first heated to a temperature over its softening point, so that liquid reactants like the polyols can be mixed homogeneously with the asphalt. The asphalt is preferably heated to about 400° F. to assure that the viscosity of the asphalt will be sufficiently lowered to enable proper mixing of the asphalt and the other reactants.

In a preferred embodiment, the asphalt is modified with polypropylene, such as atactic polypropylene. As described previously, polypropylene can be added to the asphalt in an amount of up to 10% by weight of the asphalt, although adding around 5% polypropylene is preferred. After bringing the asphalt to 400° F., APP blocks or pellets is dispersed into the hot asphalt with vigorous agitation, thereby thoroughly blending the APP with the asphalt. Alternatively, Vistamer™ can be added to the asphalt in an amount of about 10% by weight of the asphalt in order to both lessen the viscosity of the asphalt and increase the compressive strength of the final foam product.

After mixing the polypropylene or other modifier with the asphalt, the polyol or polyols are added to the reaction mixture. Polyols can be added in amounts of between about 5% and about 100% by weight of the asphalt (or, if polypropylene has been added to the asphalt, by weight of the modified asphalt), though they are preferably added in amounts of around 66% by weight of the asphalt or modified asphalt. The amount of polyol added will depend in part in the viscosity of the asphalt mixture, since a greater amount of polyol added will concurrently reduce the proportion of asphalt present, thereby lessening the viscosity of the overall mixture. Of course, viscosity reducers can also be used to bring down the viscosity of the mixture. As described above, in a preferred embodiment, the polyols which are used in the present process are castor oil, Voranol 270, and Multranol 9138, added in approximately equal amounts.

Adding castor oil to the asphalt first is advantageous, because it is believed that a chemical reaction takes place between the asphalt and the castor oil. After adding the castor oil into the hot asphalt, the mixture should be kept at a minimum of 350° F. with constant agitation for a minimum of 30 minutes. This will ensure that any chemical reaction between the asphalt and the castor oil takes place. After this step, the Voranol and Multranol can be added separately to the asphalt-castor oil mixture.

Following the addition of the polyol or polyols to the reaction mixture, the reaction mixture is maintained at between about 150° F. and about 250° F., and preferably at about 200° F., for between 1 and 3 hours, in order to assure the proper mixing of the polyols and the asphalt or modified asphalt. It is also believed that other polyols besides castor oil may also react with the asphalt to some extent during this mixing time, and that maintaining the polyols and asphalt in a mixture at 150° F.–250° F. for a period of time is important for this reason as well.

In a preferred embodiment of the present process, following the mixing of the asphalt and polyols, a viscosity reducer such as Viplex 5 is added to the reaction mixture in order to reduce the viscosity of the mixture prior to the foaming reaction. In this embodiment, viscosity reducer is added to the reaction mixture in an amount of between about 1% and about 5% by weight of the polyol and asphalt of the mixture. Preferably, about 4% by weight of a viscosity reducer is added, although this amount will depend on the particular viscosity reducer being used.

After adding the viscosity reducer, the reaction mixture should again be mechanically mixed to assure a fairly homogenous distribution of the viscosity reducer in the mixture. The mixture should then be brought to approximately 180° F., or to at least a sufficiently high temperature to maintain the mixture in a liquid state.

After the foregoing steps and just prior to adding polyisocyanate to the reaction mixture, between approximately 1% and about 5%, and preferably about 4% water is added to the reaction mixture (based on the weight of the polyol and asphalt together). Once the blowing agent has been thoroughly blended into the mixture, the foaming reaction can take place.

Before the polyisocyanate is added, the reaction mixture should be brought to between about 140° F. and 220° F., preferably about 160° F. The temperature used should be sufficient to maintain the asphalt component in a liquid form. The lower range of temperatures is preferred. However, since the viscosity of the mixture increases at these temperatures, for ease of manufacture it may not be practicable to use such lower temperatures.

The polyisocyanate itself should be at approximately room temperature when it is added to the reaction mixture, since heating the polyisocyanate greatly increases the speed of the foaming reaction. In this case, when the polyisocyanate is added to the rest of the reaction mixture, the temperature of the reactants will generally be about 100°–120° F. As the foaming reaction progresses, the temperature of the reaction mixture will climb to 180° F., since the foaming reaction is exothermic.

In order to form a polyurethane asphaltic foam, the polyisocyanate is added to the reactant mixture in a molar ratio of approximately 0.95:1 to 1.3:1 polyisocyanate:polyol, and preferably in a ratio of about 1.1:1 polyisocyanate:polyol. If an isocyanurate foam is preferred, however, the isocyanate should be added to the reactant mixture in a ratio of approximately 2.0:1 to 2.7:1, and preferably in a ratio of about 2.5:1. If such a ratio is used, then a catalyst should also be used in the process, as described above.

The foaming reaction begins as soon as the polyisocyanate is mixed with the remaining ingredients of the reaction mixture. If the Voranol/Multranol/castor oil polyol is used as the polyol for this reaction, a moderate, controlled foaming reaction will take place. If other polyols are used, however, some adjustments to the process may need to be made in order to assure a controlled reaction, as outlined above. In addition to those considerations, it should be kept in mind that Multranol 9138 contains $NH_2$ groups, which react more quickly than the hydroxy functionalities of most polyols. If polyols besides Multranol 9138 are used and it is necessary or desired to increase the speed of the reaction, another polyol having an amine group can be selected. Alternatively, a separate amine catalyst such as triethylenediamine can be added to the reaction mixture. Such a catalyst should be added after the polyol has been blended well with the asphalt.

The initial stage of the reaction, from the time the isocyanate and the asphalt-polyol mixture come into contact until the time the foam begins to rise, is called the "cream time". During this stage, the foaming reaction mixture thickens. At 120° F., cream stage lasts for about 15–20 seconds. Thus, the polyisocyanate and other reactants should be mixed together for no longer than about 2–6 seconds before being placed into a mold. Otherwise, the foam may expand to a point beyond that desired in the final molded product, or may cure before taking on the desired form of the mold.

In the second stage of the foaming reaction, called the "rise time", the foam begins to expand. During this stage, sufficient $CO_2$ is produced to cause expansion of the foam. In addition, if blowing agents have been added, such blowing agents volatilize at this time, due to the heat created by the foaming reaction. The lengths of the cream time and rise time of the foaming reaction will depend on the chemical reaction rate, the temperature of the mixture, the mold temperature, and the temperature of the environment. The foam is cured when the foam surface is no longer tacky, which usually occurs within 1.5 to 2 minutes.

One of the great advantages of the present process is that it can be performed under the foregoing conditions, which are sufficiently controlled to be useful in a manufacturing process. Asphaltic polyurethane foams produced by prior art methods were, generally, made using lower percentages of asphalt or softer asphalts, as well as lower reaction temperatures. For this reason, such reactions required catalysts to be commercially useful. However, due to the use of the higher reaction temperatures of the present process, catalysts other than the NH groups which can be present in the polyol should not be used when producing an asphaltic polyurethane foam according to the present invention.

Although the reaction can be run at temperatures higher than 180° F., the speed of the reaction increases ten times for every 10° F. increase in temperature over 180° F. Thus, although the present reaction can be performed at temperatures of up to 200° F., it is not preferred to use such high temperatures due to the greatly increased speed of the reaction and a concomitant increase in the difficulty of manufacture at such increased speed. In the case of certain highly viscous asphalts which can be used according to the present invention, higher temperatures will help such asphalts to flow better by reducing their viscosity, but, as stated previously, this aid in manufacturing must be balanced against the difficulty of controlling faster reactions.

Using temperatures above 200° F. is, in most cases, disfavored in the present process. At such higher temperatures, the speed of the foaming reaction becomes unacceptably violent.

In a preferred embodiment, the reaction mixture is injected into a mechanical mixer, such as a Cannon U.S.A. Model C-30. In this embodiment, a metering ratio of 1/1.5 (polyisocyanate/asphalt-polyol reaction mixture) is preferably used. This produces an asphaltic polyurethane foam.

Generally, the foam takes about 1.5 to 2 minutes to cure once it has expanded to fill a mold into which it has been placed. However, the cure time will depend on the reaction temperature, the type of polyol used, the process environment, and other variables.

Preferably, the reaction mixture is placed in a mold (or, alternatively, a mold is placed around the mixture) in order to form a molded article. However, for some applications the foam can also be allowed to rise freely without a mold.

The asphaltic foams of the present invention can, in an alternative embodiment, comprise asphaltic polystyrene or asphaltic PVA foams. In such embodiments, the asphalt used in the present process would be mixed with the precursors of polystyrene or PVA in the amounts described previously in connection with the production of polyurethane and isocyanurate foams.

EXAMPLE 1

A small batch of an improved asphaltic polyurethane foam is produced as follows. A non-blown asphalt having a penetration of about 12 and a softening point of about 135° F. is first selected. This asphalt is available from Oxnard Refinery. Approximately 3 kg of this asphalt is heated to 400° F. in a container. About 0.15 kg of atactic polypropylene is then added to the asphalt in the container. The polypropylene is dispersed homogeneously into the asphalt matrix by mechanically mixing it into the asphalt. This asphalt-polypropylene mixture is known as modified asphalt.

A mixture of polyols is next added to the modified asphalt. These polyols are Voranol 270, Multranol 9138, and castor oil, and each is present in the polyol mixture in about equal amounts by weight. The 0.68 kg castor oil is added first to the modified asphalt and stirred vigorously for 30 minutes at 350° F. (the asphalt, originally heated to around 400° F., drops in temperature to around 350° F. after the polypropylene and castor oil are added to it). After this, a mixture of 0.68 kg Voranol 270 and 0.68 kg Multranol 9138 is added. The reaction mixture is then brought to 200° F. for 2 hours to ensure good mixing of the modified asphalt and the polyols (this temperature could be lower, as long as the asphalt in the asphalt-polyol mixture remains sufficiently liquid that it can be mixed with the polyol).

Next, about 80 grams of Viplex 5 viscosity reducer is blended into the reaction mixture, and the mixture is brought to 180° F. Following this, about 80 grams of water is mixed into the reaction mixture.

Finally, Mondur 489 polyisocyanate is mixed with the foregoing reaction mixture. Using a mechanical mixer with a metering ratio of 1/1.5 (polyisocyanate/reaction mixture), the polyisocyanate and remaining reaction mixture are injected into the mixture. Within 2–6 seconds, this mixture is then deposited in a mold. The mixture begins rising and forming a foam, and after 60 seconds the foam is completely formed. Within another 2 minutes, the foam is cured.

EXAMPLE 1A

Figure 7:
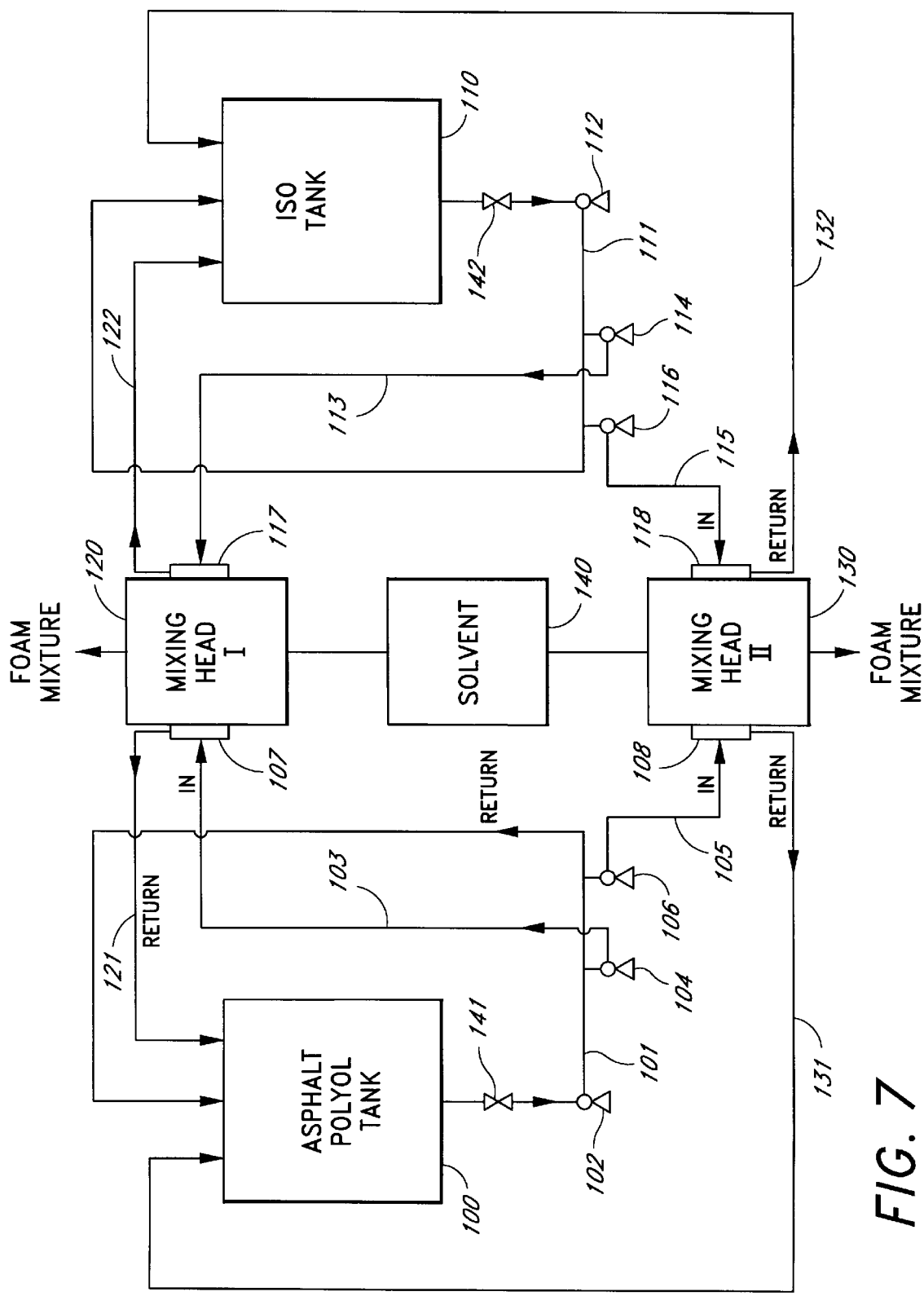
FIG. 7 is a schematic diagram of a process for manufacturing an asphaltic foam according to the present invention.
Figure 8A:
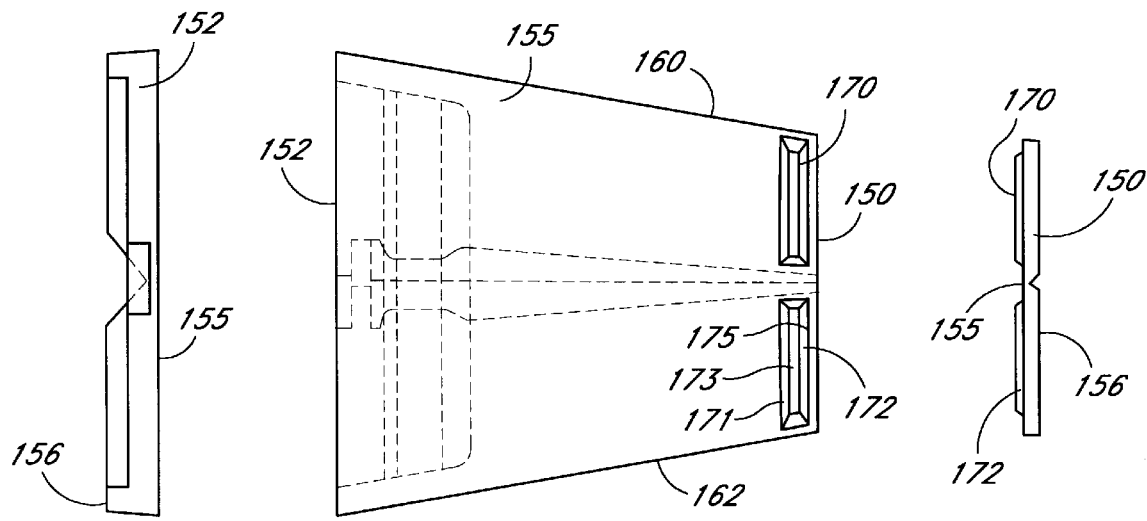
FIG. 8A is a top plan view of an alternative embodiment of a ridge cap according to the present invention.
Figure 8B:
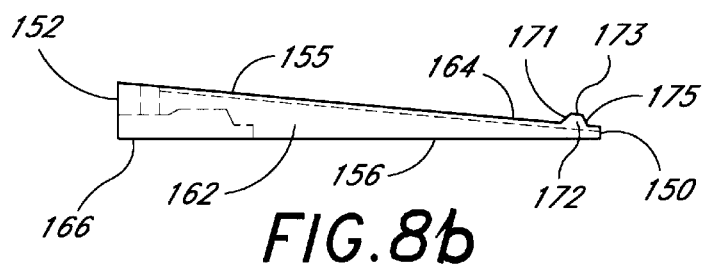
FIG. 8B is a side view of the embodiment of the ridge cap shown in FIG. 8A taken from side 162.
Figure 8C:
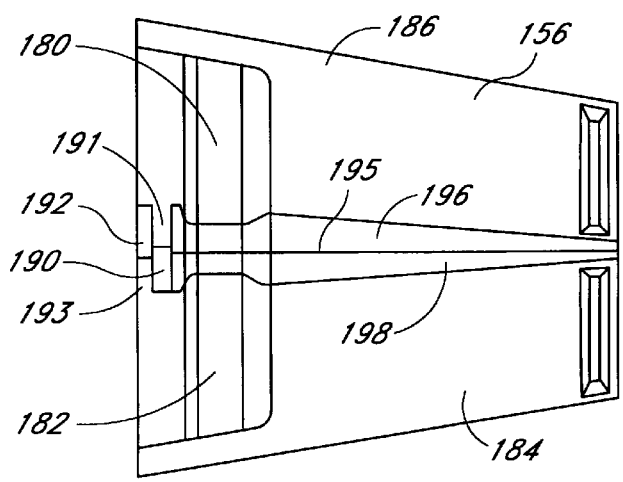
FIG. 8C is a bottom plan view of the embodiment of the ridge cap shown in FIG. 8A.
Figure 8D:
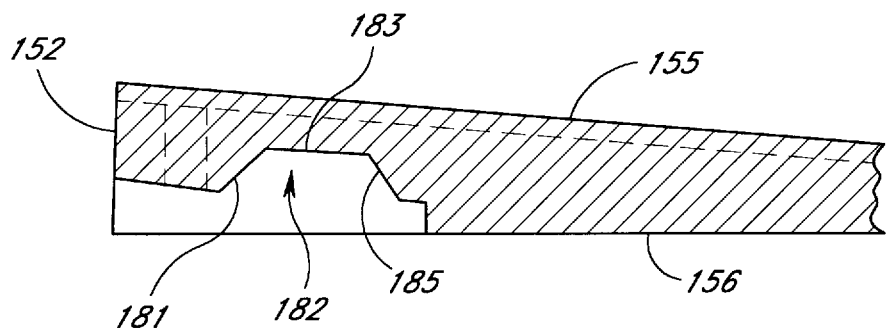
FIG. 8D is a partial cut-away view taken along line 8—8 of the embodiment of the ridge cap shown in FIG. 8A.
Figure 8E:
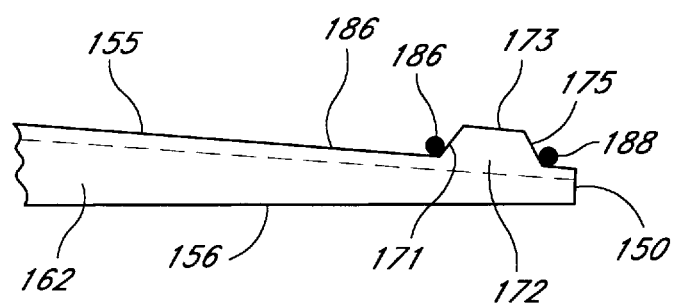
FIG. 8E is a partial side view of the embodiment of the ridge cap shown in FIG. 8A taken from side 162, also showing the placement of modified asphalt on the interlocking portion of the ridge cap in order to seal it to another ridge cap.

A manufacturing process for producing the asphaltic foams of the present invention on a somewhat larger scale is outlined in FIG. 7. A non-blown asphalt having a penetration of about 12 and a softening point of about 135° F. (available from Oxnard Refinery) is first selected. Approximately 30 kg of this asphalt is heated to 400° F. in an insulated tank 100 which holds approximately 15 gallons, and about 1.5 kg of atactic polypropylene is then added to the asphalt in the tank 100. The polypropylene is dispersed homogeneously into the asphalt matrix by mechanically mixing it into the asphalt by means of a mechanical mixer (not shown) having a mixing shaft that extends into the tank 100. The mixer preferably rotates at approximately 1,200 revolutions per minute while blending the asphalt with other components of the reaction mixture described herein.

A mixture of three polyols in approximately equal amounts is next added to the asphalt-polypropylene mixture (i.e., the modified asphalt) in tank 100. Approximately 6.8 kg castor oil is first added to the modified asphalt, and the mixture is stirred vigorously for 30 minutes at 350° F. After this, a mixture of 6.8 kg Voranol 270 and 6.8 kg Multranol 9138 is added. The reaction mixture is then brought to 200° F. for 2 hours to ensure good mixing of the modified asphalt and the polyols.

Next, about 0.8 kg of Viplex 5 viscosity reducer is blended into the reaction mixture, and the mixture is brought to 180° F. Following this, about 0.8 kg of water is mixed into the reaction mixture.

Another insulated tank 110 holds the polyisocyanate, Mondur 489, which should be at approximately room temperature. This tank can hold about 15 gallons, and is preferably sealed from the atmosphere. The isocyanate in the tank 110 is blanketed with 3–5 p.s.i. (pounds per square inch) of nitrogen gas in order to keep moisture out of the isocyanate.

In order to begin manufacturing the foam of the present invention, the mixture of asphalt, polyol, and other components in tank 100 is pumped through an insulated flexible metal hose, line 101, by means of a Viking positive displacement gear pump 102 controlled by a variable speed control (in this example, all the lines are insulated flexible metal hoses, and all the pumps are Viking positive displacement gear pumps). Pump 104 then further pumps the mixture through line 103 and into mixing head 120. This mixing head (as well as mixing head 130) is a Decker Industries low pressure 5,000 rpm motor driven mixing head. In addition, the mixture from tank 100 is also pumped by the pump 106 through line 105 into mixing head 130.

The metering or rate of flow of the reaction mixture components into mixing heads 120 and 130 is largely controlled by the action of pumps 104 and 106. When the system is in circulation mode, pneumatically controlled three way valves 107 and 108 prevent the reaction mixture from flowing into the mixing heads 120 and 130, respectively. Instead, valve 107 routes the reaction mixture through line 121 and back into tank 100. Similarly, valve 108 redirects the reaction mixture through line 131 into tank 100 in circulation mode. Valve 141 can be used to shut off the flow of reaction mixture from the tank 100 entirely, if necessary.

At the same time that the reaction mixture is added to the mixing heads 120, 130, the polyisocyanate is also pumped into these mixing heads. A pump 112 pumps the isocyanate through line 111, and pump 114 then further pumps the mixture through line 113 and into mixing head 120. The isocyanate from tank 110 is also pumped by the pump 116 through line 115 into mixing head 130.

When the system is in circulation mode, pneumatically controlled three way valves 117 and 118 prevent the reaction mixture from flowing into the mixing heads 120 and 130, respectively. Instead, valve 117 routes the reaction mixture through line 122 and back into tank 110. Similarly, valve 118 redirects the reaction mixture through line 132 into tank 110 in circulation mode. Valve 142 can be used to shut off the flow of reaction mixture from the tank 110 entirely, if necessary.

When the system is in production mode and the reaction mixture of tank 100 is being mixed with isocyanate, the mixing heads mix the isocyanate and asphalt-polyol reaction mixture. If a metering ratio of 1:1.5 (polyisocyanate:reaction mixture) is used, the resulting foam will be a polyurethane foam. A metering ratio of approximately 1:1 (by weight), on the other hand, should result in an isocyanurate foam. When the reaction mixture and isocyanate are mixed, the temperature of the reactants will generally be about 100°–120° F. As the reaction progresses, the temperature of the foaming reaction mixture will climb to 180° F., since the foaming reaction is exothermic.

Within 2–6 seconds of the reactants being injected into the mixing heads 120, 130, the mixture is deposited onto a conveyor belt and covered by a mold (not diagrammed). The mixture begins rising and forming a foam, and after 60 seconds the foam is completely formed. Within another 2 minutes, the foam is cured.

At intervals during the production of asphaltic foam, a solvent such as Foam Flush™ (made by International Specialty Products, 15300 Ventura Boulevard, Sherman Oaks, Calif. 91403) is flushed through the mixing heads 120, 130 from a solvent tank 140. The solvent cleans the mixing heads and prevents them from becoming clogged. Other solvents capable of removing the reacted and unreacted reactants from the mixing heads, such as methylene chloride, can also be used, as will be apparent to one of skill in the art.

C. Final Product

The final product of the process of the present invention, after curing, is a hard, rigid asphaltic polyurethane or isocyanurate foam. In one embodiment, this foam has the following characteristics:

1. Compressive strength—more than 60 psi.
2. Cell structure—more than 85% closed cells.
3. Density—4–10 lb./ft.$^3$
4. Dimensional Stability—no change at 140° F.
5. Weatherability—good.
6. Leaching—Asphalt does not leach from the final product when heat or most solvents are applied to it. However, if the asphaltic foam is extracted with an organic solvent such as trichloroethane, some asphalt components can be extracted from the foam. Thus, while some of the asphalt components covalently bond to the polyurethane polymer of the foam of the present invention, some components seem to be held in the foam by weaker bonds, such as hydrogen bonds.
7. Resistance to water and freezing—good.
8. Resistance to heat—good.

In addition to the foregoing qualities, which are essentially common to asphaltic polyurethane and asphaltic isocyanurate foams of the present invention, the isocyanurate foams that are formed are in addition more flame retardant, have somewhat more compressive strength, and have more dimensional stability than the asphaltic polyurethane foams of the present invention. The differences in the physical properties of the polyurethane and isocyanurate foams are believed to be due to increased cross-linking between isocyanate molecules in the isocyanurate foam compared to the polyurethane foam.

III. Structural Applications for Improved Asphaltic Foam

The rigid asphaltic foam of the present invention can be used in a number of applications in which a structurally strong element is needed. In the construction industry, several such applications are contemplated. The foam of the present invention can, for example, be used as a light weight alternative to concrete tile. Other contemplated uses include as a walking deck, a slab barrier, recover protection board, concrete expansion board, back fill protection board, and base flashing crickets.

The asphaltic foam of the present invention can be used to particular advantage in the roofing sector of the construction industry. For example, as discussed previously, there is a need for an alternative material for ridge caps to replace asphaltic papers. By combining the low cost, strength, and durability of asphalt with the molding ability of a plastic material, which can be molded into any desired shape, the foam of the present invention can be used as an alternative to conventional asphaltic paper ridge caps.

A. Ridge Cap Having an Elastomeric Strip

In one embodiment, the asphaltic foam of the present invention is formed into a bendable ridge cap 10 (FIG. 1). A ridge cap 10 having an elastomeric strip 20 can be made through molding as follows (illustrated in FIGS. 4a–4c). A flat, generally rectangular surface at least 12¼" long and at least 10" wide is first chosen as the lower surface of the mold. The lower surface is preferably the surface of a conveyor belt 40.

On this conveyor belt 40 is placed a layer of roofing granules 30 (FIG. 4a). These granules 30 will serve as both a protective weather layer for the ridge cap 10 and as a mold release. The granules themselves are preferably approximately 40 mesh in size, although any size roofing granules can be used, as long as such granules will stick to and cover the surface of the foaming material. The protective layer can also be slate flake or other material capable of providing protection from the weather elements.

The granules are preferably placed on the conveyor belt by means of an automatic granule system which deposits granules on the conveyor belt at a predetermined rate. The granules are provided to the conveyor belt from a discharge holding tank (not shown) when a gate near the bottom of the discharge holding tank is opened. The gate, which can be in the form of a slot, should have an approximately uniform width so that the granules can be dropped onto the conveyor belt at an approximately uniform rate. The amount of granules deposited on the conveyor belt over a given period of time is controlled both by the size of the gate which allows the granules to leave the holding tank and by the speed of the conveyor belt.

The granules from the holding tank are gravity fed from the holding tank. In one embodiment, the holding tank is constructed to be able to hold a large quantity of granules. In a preferred embodiment, however, a smaller holding tank or hopper can be used. In this embodiment, the granules are fed into the hopper from, for example, a 2–3 ton bulk bag of granules by means of a hose.

The layer of roofing granules 30 is preferably about ¼" deep, but can be between about ³⁄₁₆" and ½" deep. A scraper having a straight surface is preferably passed over the granule layer at a predetermined height (corresponding to the desired thickness of the granule layer) in order to assure a relatively uniform thickness of the granule layer.

After placing the layer of roofing granules 30 on the moving conveyor 40, a strip of modified asphalt 20 is placed on top of the granules 30 (FIG. 4b). The modified asphalt is preferably pumped from a tank by a pump capable of metering the flow of modified asphalt, such as a Viking variable speed control positive displacement gear pump, and then extruded. The strip 20 is between 1" and ⅝" wide, and is preferably ½" wide. It is also ¹⁄₁₆" to ⅛" deep and is at least as long as the mold. In a preferred embodiment, the strip is continuously extruded onto a granule layer on a conveyor belt. At the pressures used to form the foam 12 of the present invention, the granules 30 of the granule layer which contact the strip 20 will become embedded in the strip 20, adding to the durability of the ridge cap 10.

The modified asphalt of this strip 20 is made up of the asphalt of the present invention in admixture with about 20% (by weight of the asphalt) SBS. This modified asphalt mixture should be sufficiently elastic so that the ridge cap 10 can be bent at an angle. If the ridge cap is to be used only in environments which remain above 4°–5° C., then atactic polypropylene can be used in place of the SBS modifier. However, it has been found that at around 4°–5° C. and below, a strip 20 containing atactic polypropylene as the modifier is too brittle.

A thin strip of mylar film 50 is preferably placed on top of the modified asphalt strip 20 (FIG. 4c). The mylar strip 50 will allow the mold to be removed from the finished product more easily after the product is formed.

The reaction mixture 60 produced as described in Examples 1 and 1A is next placed on the layer of granules 30 on either side of the modified asphalt strip 20 (FIG. 4c). A mold 70 is then placed over the reacting foam 60 such that the foam is completely enclosed within the mold 70 (FIG. 5). In one embodiment, this mold includes a V-shaped member which protrudes downward from the roof 71 of the mold 70 to the modified asphalt strip 20. The V-shaped notch 14, whose sides are at an angle of approximately 30° from the horizontal plane of the mold, contacts the modified asphalt strip 20 at the apex of the notch 14. The sides of the mold 70 are preferably of different lengths and thicknesses so as to give a tapered appearance to a ridge when the ridge caps 10 of the present invention are laid on top of one another in a staggered manner, as shown in FIG. 5.

The inside surfaces of the molds used in the present invention are preferably treated with a spray mold release, such as a silicone based mold release. Alternatively, the inside of the molds can comprise a layer of Teflon™ (PTFE) to facilitate the removal of the finished foam product from the molds.

The reacted foam 12 on either side of the modified asphalt strip 20 in the final ridge cap product 10 thus does not contact the reacted foam 12 on the other side of the modified asphalt strip 20, but is instead connected by the modified asphalt strip 20. Since the modified asphalt strip 20 is elastic, the final ridge cap product 10 can therefore be bent and re-bent along the longitudinal axis of the strip 20 without breaking or weakening the ridge cap 10.

EXAMPLE 2

A ridge cap 10 having an elastomeric strip 20 as shown in FIG. 1 is made with the improved asphaltic foam of the present invention as follows. A mold 70 is first made to contain the reacting foam and thereby form a molded asphaltic polyurethane product. The mold 70 includes sides which form an inner surface that is 10" long on two opposite sides, and that has two other sides of unequal length, 12¼" and 10¼" respectively. The thickness (height) of the mold 70 sides rises from ⅜" on the side of the mold 70 which is 10¼" long to ⅝" on the side of the mold which is 12¼" long. The different lengths and thicknesses of the ridge cap 10 formed with such a mold 70 give a tapered appearance to a ridge when the ridge caps 10 are laid on top of one another in a staggered manner. The roof 71 of the mold 70 is generally flat and joins the upper ends of the sides. In order to promote the complete filling of the mold with foam, 4 slight indentations 72 approximately 1/16"–1/8" deep (FIG. 6) are formed in the roof 71 of the mold 70.

A flat, moving conveyor surface 40 about 20" wide is chosen as the lower surface of the mold. On this lower mold surface is placed a layer of roofing granules 30. These granules 30 will serve as both a protective weather layer for the ridge cap 10 and as a mold release. The layer of roofing granules 30 is approximately 1/4" deep, 16" wide along with the conveyor. The granules 30 themselves are approximately 40 mesh in size.

After placing the layer of roofing granules 30 on the lower surface of the mold, a strip 20 of modified asphalt is placed on top of the granules 30. The strip 20 is approximately 1/2" wide, 1/16"–1/8" deep, and is as long as the mold. The modified asphalt of this strip 20 is made up of the asphalt used to produce the foam of the present invention in admixture with about 20% (by weight of the asphalt) styrene-butyl-styrene (SBS). This modified asphalt mixture is fairly elastic.

The asphaltic foam described in Example 1 is next mixed, and about 1000 grams of the mixed reactants 60 are placed on the granule layer on either side of the modified asphalt strip 20. The mold 70 is then placed over the reacting foam 60 such that the foam 60 is completely enclosed within the mold 70. The mold 70 includes a V-shaped member which protrudes downward from the roof 71 of the mold 70 to the modified asphalt strip 20. The V-shaped member, whose sides are at an angle of approximately 30° from the horizontal plane of the mold 70, contacts the modified asphalt strip 20 at its apex. At its base, the V-shaped member widens from about 1/4" across at the end of the ridge cap 10 which is about 12 1/4" wide to about 3/4" across at the end of the ridge cap 10 which is 10 1/4" wide.

The reacted foam on either side of the modified asphalt strip 20 in the final ridge cap product thus does not contact the reacted foam on the other side of the modified asphalt strip 20, but is instead connected by the modified asphalt strip 20. Since the modified asphalt strip 20 is elastic, the final ridge cap product can therefore be bent and re-bent without breaking or weakening the ridge cap 10.

EXAMPLE 3

A continuous process for producing the ridge cap 10 of Example 2 is as follows. In this embodiment, the upper surface of a conveyor belt 40 forms the lower surface of the mold 70. The conveyor belt 40 is preferably about 20" wide.

A 16" wide layer of roofing granules 30 is deposited on the conveyor belt 40 from a discharge holding tank through a gate near the bottom of the discharge holding tank by means of a gravity feed. The gate should have an approximately uniform width so that the granules can be dropped onto the conveyor belt at an approximately uniform rate. These granules 30 are deposited on the conveyor belt 40 in a layer approximately 1/4" deep. Mechanical scrapers approximately 1/4" from the conveyor belt surface extending the width of the conveyor belt 40 assure a relatively even thickness of granules 30 in the granule layer.

In this embodiment, the modified asphalt strip 20 and the two strips of reacting foam on either side of it are deposited continuously on the conveyor belt 40. The conveyor belt 40 should move just fast enough so that the extruded foam is dropped on the granule surface in an amount which will result in the mold 70 being completely filled. Just after the modified asphalt strip 20 is deposited, a 0.5 mm wide strip of mylar film 50 is then dropped on top of the modified asphalt strip 20. The mylar strip 50 will allow the mold 70 to be removed from the finished product more easily after the product is formed.

After the modified asphalt strip 20 and reacting mixture are dropped onto the conveyor belt 40, molds 70 as described in Example 2 are placed on the conveyor belt 40 in succession. The molds 70 fit against each other such that the trailing end 74 of one mold 70 (with respect to the direction in which the conveyor belt 40 is traveling) will abut the leading edge 76 of the next mold 70 on the conveyor belt 40. The molds 70 are placed over the modified asphalt strip 20 and the reacting mixture 60 one after the other continuously.

Once the final foam product has been formed and cured, the molds 70 are removed from the products. Since the reacting mixture 60 and modified asphalt strip 20 were placed on the conveyor belt 40 continuously, each ridge cap 10 will be joined to the ridge cap 10 in front of and behind it at this point. However, the molds 70 are formed for the continuous process such that the leading 76 and trailing 74 edges of the mold 70 which contact the dropped modified asphalt strip 20 and reacting mixture 60 allow the formation of only a thing strip of foam between two consecutive ridge caps.

Consecutive ridge caps 10 can then be separated after formation by simply bending the joined ridge caps at this thin strip of foam and breaking one ridge cap 10 from another, or by cutting the ridge caps at this thin strip. One way to cut the ridge caps is with a hot knife. The hot knife comprises a thin blade heated with electricity to a relatively high temperature, such as a temperature of around 600° F.–700° F. The use of a hot knife to separate adjoining ridge caps is preferred to breaking the joined ridge caps because the foam at the ends of the ridge caps is heat sealed at the same time that the caps are separated when a hot knife is used. A preferred way of cutting the ridge caps, however, comprises the use of high pressure steam, which can be at a pressure of 70,000–80,000 p.s.i. The steam not only cuts the foam, but also cuts the granule layer of the ridge caps more evenly than when a hot knife is used.

EXAMPLE 4

An alternative embodiment of the ridge cap of Example 3 is provided with vents so that it can function as both a ridge cap 10 and as a ridge vent. In order to provide venting, a slight indentation or vent 16 is formed in the lower surface of the ridge cap 10 between the modified asphalt strip 20 and the side edge 18 of the ridge cap 10. Such a vent can be provided by including a protruding member in the roof 71 of the mold 70 used to form the ridge cap 10 between the central axis of the roof of the mold 70 and the side edge 18 of the mold 70. In this way, vents 16 can be provided on either side of the central axis of the ridge cap 10 (that is, the axis along which the modified asphalt strip 20 is placed). In addition, multiple vents can also be provided on either side of the modified asphalt strip 20 of the ridge cap 10.

EXAMPLE 4A

An alternative embodiment of a ridge cap made according to the present invention is shown in FIGS. 8A–8E. In this embodiment, sides 150 and 152 are roughly parallel, while sides 160 and 162 each extend from side 150 to side 152 at greater than a 90° angle so that sides 160 and 162 are not parallel. It should be understood, however, that sides 160 and 162 could also be parallel, and that the non-parallel alignment of sides 160 and 162 is an ornamental feature. The alignment of sides 160 and 162 in the embodiment depicted in FIGS. 8A–8E is such that when side 152 of a ridge cap according to this embodiment is laid over a side 150 of another, adjoining ridge cap of this embodiment, the sides 160 and 162 of each of the adjoining ridge caps will line up such that edge 164 near side 150 of the lower adjoining ridge cap will contact or be adjacent to the edge 166 near side 152 of the upper adjoining ridge cap.

Near side 150 are two raised members 170 and 172 which extend upwardly from the upper surface 155 of the ridge cap in this embodiment. These raised members are designed to fit into cavities 180, 182 on the lower surface 156 of another ridge cap of this embodiment. In this embodiment, surfaces 171, 173, and 175 of raised member 172 fit into cavity 182 and contact or come into close proximity with surfaces 181, 183, and 185 of cavity 182, respectively. Raised member 170 similarly fits into cavity 180. One of skill in the art will appreciate that the raised members can comprise other shapes and sizes, as long as they fit into or otherwise cooperate with cavities on the lower surface of an adjoining ridge cap. One of skill in the art will also appreciate that in other embodiments, only a single raised member or more than two raised members can be present on the upper surface of the ridge cap, as long as such raised members cooperate with corresponding cavities on the lower surface of an adjoining ridge cap.

The raised members 170, 172 cooperate together with the cavities 180, 182 to form an interlock system which helps secure a ridge cap to the ridge caps in either side of it. By securing the raised member of one ridge cap to a cavity on the underside of the adjoining ridge cap, the ridge caps of the present invention, when assembled together, impart an aesthetically pleasing layered appearance to a ridge line.

Raised member 172 can be further secured to the cavity 182 of an adjoining ridge cap by means of pieces or strips of modified asphalt 186, 188 which are placed on upper surface 155 in contact with or adjacent to surfaces 171 and 175 of raised member 172. Modified asphalt can be similarly located on raised member 170 in order to secure it to cavity 180. When a ridge cap of this embodiment is secured to an adjoining ridge cap, the modified asphalt on the raised members contacts the corresponding surfaces in the cavities of the adjoining ridge cap. If the modified asphalt has been heated prior to being applied to the ridge caps, it will immediately bond to the surfaces of the cavities of the adjoining ridge cap, and thereby form a seal between the adjoining ridge caps. Even if the modified asphalt is not heated, it will self-seal the adjoining ridge caps as it melts under the influence of heat from the sun.

In the ridge cap of the present embodiment, surfaces 196 and 198 extend from the lower surface 156 of the ridge cap towards the upper surface and also taper or extend toward central groove 195 from a point horizontally distant from the central groove 195, thereby forming a channel which extends through the longitudinal center of the ridge cap. In order to stop water, wind, insects, and other undesirable elements from entering or passing through this channel, this embodiment of the ridge cap of the present invention is provided with cavities 190, 192 (referred to herein as "notches") and protruding members 191, 193 on the underside of side 152 of the ridge cap. The protruding members 191, 193 can, for example, be rectangular blocks extending from a surface on the underside of the ridge cap, in this case surfaces 196 and 198, respectively. The notches can be spaces in the lower surface of the ridge cap which are shaped to receive such rectangular blocks.

When the ridge cap of this embodiment is bent around groove 195 so that surfaces 184 and 186 on the underside 156 of the ridge cap form an angle of less than 180° (i.e., the ridge cap is bent so that surfaces 184 and 186 come closer together), protruding member 191 extends into notch 190, and protruding member 193 likewise extends into notch 192. When this happens, the protruding members 191, 193 block the channel formed by tapered surfaces 196 and 198 on the underside 156 of the ridge cap. Without the protruding members 191, 193 and notches 190, 192, a channel would remain in the underside of the ridge cap extending along groove 195. The protruding members 191, 193 and notches 190, 192 therefore cooperate to block or at least partially block that channel.

EXAMPLE 4B

Figure 9:
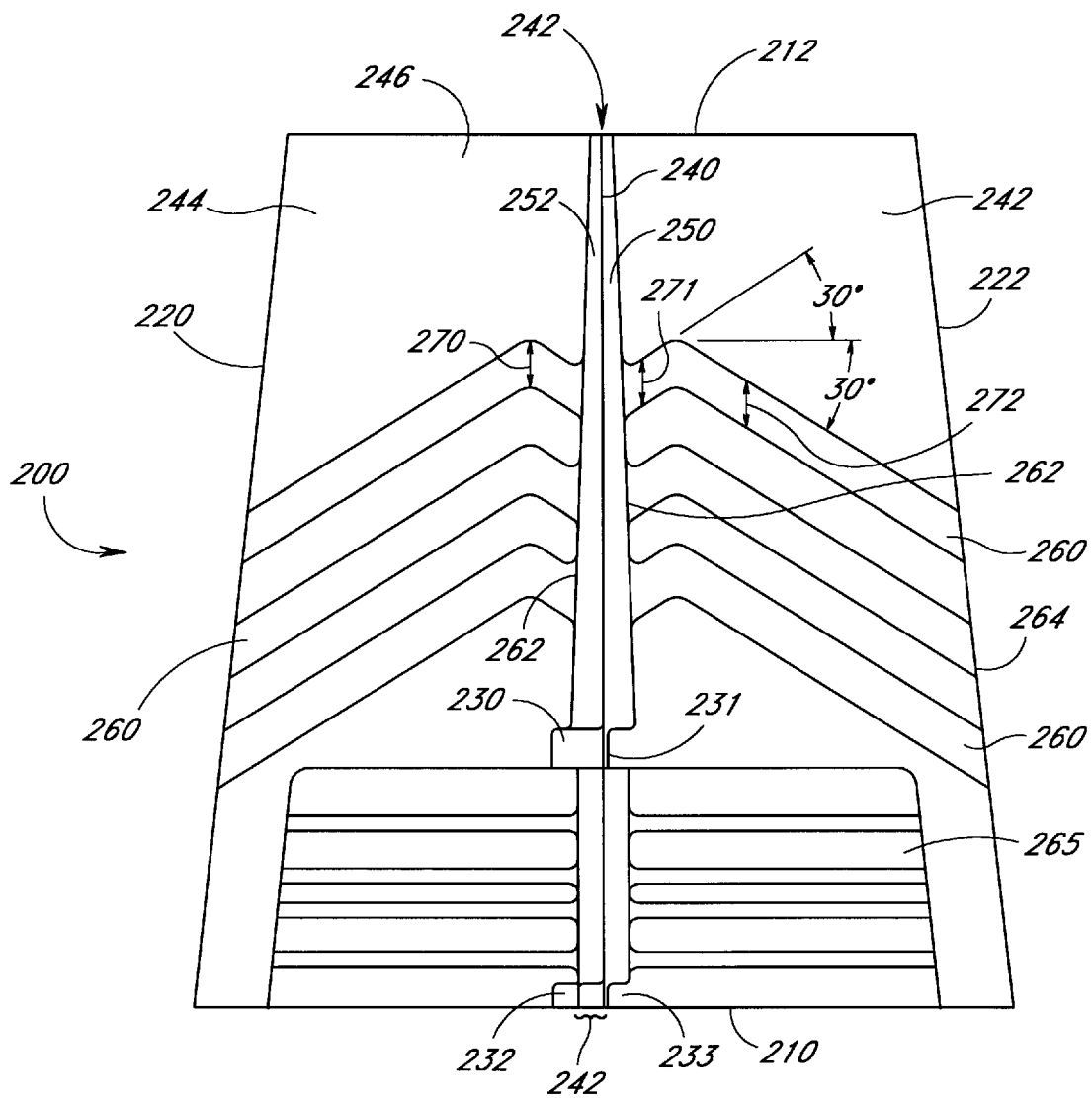
FIG. 9 is a bottom plan view of another alternative embodiment of a ridge cap according to the present invention.
Figure 10B:
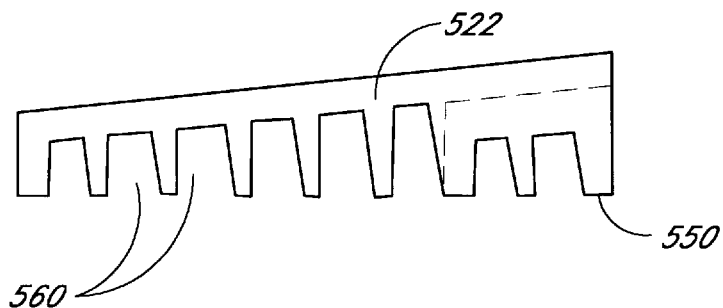
FIG. 10B is a side view of the embodiment of the ridge cap shown in FIG. 10A, taken from side 522.
Figure 10C:
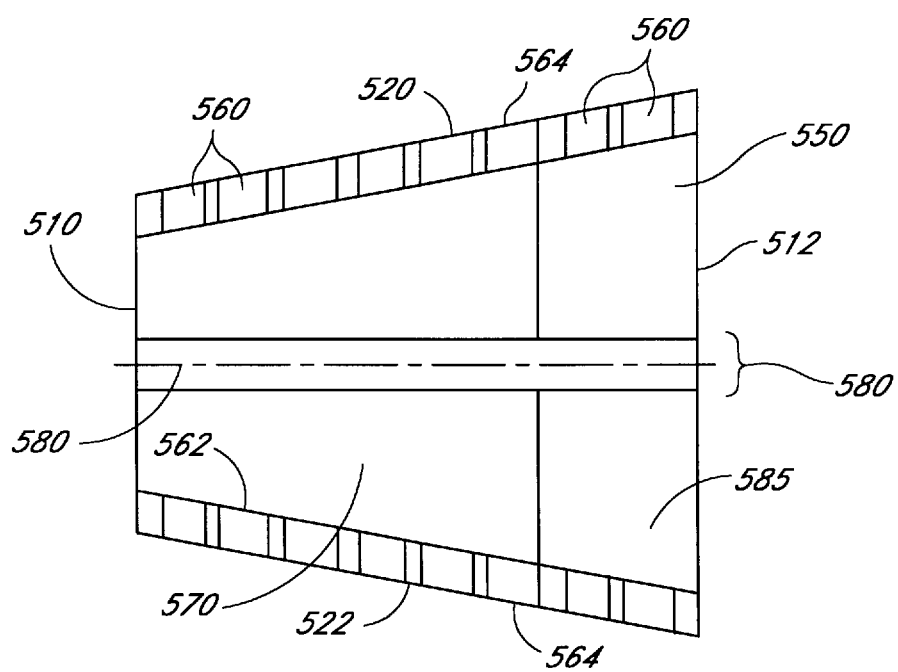
FIG. 10C is a bottom plan view of the embodiment of the ridge cap shown in FIG. 10A.

Another alternative embodiment of a ridge cap made according to the present invention is shown in FIG. 9. In this embodiment 200, sides 210 and 212 are roughly parallel, while sides 220 and 222 each extend from side 212 to side 210 at greater than a 90° angle so that sides 220 and 222 are not parallel. In a preferred embodiment, side 212 is approximately 7¹⁰⁄₁₆" wide and side 210 is approximately 10" wide.

Similar to the embodiment of Example 4A, this embodiment also comprises a system of notches 230 and 232 which receive protruding members 231 and 233, respectively, when the ridge cap 200 is bent around groove 240 such that surfaces 242 and 244 on the lower surface 246 of the ridge cap 200 come into closer contact with one another. Groove 240 extends along the longitudinal axis of the ridge cap. The protruding member 231 in this embodiment is located intermediate a ends 210, 212 and extends from surface 250.

This embodiment 200 also includes the interlocking feature of the embodiment of Example 4A. Located on the lower surface 246 of the ridge cap 200 near side 210 are a series of one or more indentations or cavities 265 sized to receive one or more protruding members (not shown) located on the upper surface of the ridge cap 200 near side 212. Five such cavities 265 are depicted in FIG. 9. These cavities 265 preferably extend approximately 4⅛" from the central groove 240 and are located on both sides of the central groove 240. In addition, this embodiment could incorporate the self-sealing feature of the embodiment of Example 4A, although this feature is not depicted in FIG. 9.

In this embodiment, surfaces 250 and 252 extend from the lower surface 246 of the ridge cap 200 towards the upper surface of the ridge cap. These surfaces 250, 252 also extend toward the central groove 240 from a point axially distant from the central groove 240, thereby forming a central channel 242. The channel formed by surfaces 250 and 252 in this embodiment communicates with a series of vents 260 through central channel openings 262 of the vents 260. The vents 260 are preferably formed as channels on the lower surface of the ridge 200.

The vents 260 serve to ventilate the roof of a structure to which the ridge cap 200 is applied by allowing communication between the environment (through vent outlets 264) and the central channel (through central channel openings 262). In this embodiment, it is envisioned that a further source of ventilation, such as a turbo vent, would also be used with this embodiment of the ridge cap of the present invention in order to provide sufficient ventilation to a roof.

In prior art vents for ridge caps, steel wool, fiberglass, or some other filtering material is generally provided in the vents of the ridge cap in order to prevent water, insects, dirt, and other undesirable elements from entering the ridge cap and ultimately the roof of the structure on which the ridge cap is located. Such filtering material can also be used in the present embodiment 200 of the ridge cap of the present invention.

In the present embodiment, a bend or kink 270 in the vents is provided in order to prevent the entry of such undesirable elements. In a preferred embodiment, the segments 271, 272 of at least one vent, and preferably all the vents 260, forms an angle of approximately 30° at the bend 270.

EXAMPLE 4C

A further alternative embodiment of a ridge cap made according to the present invention is shown in FIGS. 10A–10E. In this embodiment 500, sides 510 and 512 are roughly parallel, while sides 520 and 522 each extend from side 510 to side 512 at greater than a 90° angle so that sides 520 and 522 are not parallel. Although not shown in FIGS. 10A–10E, this embodiment could also include the interlocking and self-sealing features of the embodiment of Example 4A, as well as the system of notches and protruding members of Examples 4A and 4B.

Like the embodiment of FIG. 9, this embodiment 500 also contains a series of vents 560 formed on the underside 550 of the ridge 500. The vents 560 serve to ventilate the roof of a structure to which the ridge cap 500 is applied. Unlike the embodiment of FIG. 9, however, it is envisioned that the ridge caps according to this embodiment 500 would provide sufficient ventilation, on the order of 1 ft$^2$ of vent space per 150 ft$^2$ of attic area or greater, to meet standard building codes. Therefore, these ridge caps could be used on a structure without the need to provide an extra source of ventilation for the roof of the structure.

Due to the larger size of the vents 560, there is a greater risk that water, dirt, insects, or other undesirable elements might enter the vents 560. In order to prevent this, steel wool, fiberglass, or some other filtering material can be provided in the vents 560 of the ridge cap 500 and/or in an intermediate chamber 570 of the ridge cap 500. The vents 560 communicate with the intermediate chamber 570 through intermediate chamber openings 562 and further communicate with the environment through vent outlets 564. The intermediate chamber 570 adjoins and communicates with a central channel 580, formed in the lower surface 585 of the ridge cap 500, which parallels the longitudinal axis 590 of the ridge cap 500. The central channel 580 itself communicates with the roof or attic of a structure to which the ridge cap is attached, thereby providing ventilation between the roof or attic and the environment.

EXAMPLE 4D

Yet another alternative embodiment of a ridge cap made according to the present invention is shown in FIGS. 11A–11C. In this embodiment 300, sides 310 and 312 are roughly parallel, while sides 320 and 322 each extend from side 312 to side 310 at greater than a 90° angle so that sides 320 and 322 are not parallel. Although not shown in FIGS. 11A–11C, this embodiment could also include the interlocking and self-sealing features of the embodiment of Example 4A, as well as the system of notches and protruding members of Examples 4A and 4B.

The vents 360 are similar to the vents 560 shown in FIGS. 10A–10E in Example 4C above. These vents likewise comprise vent outlets 364 and intermediate chamber outlets 362. Also like the vents of the embodiment of Example 4C, it is envisioned that the vents 360 of the present embodiment 300 would provide sufficient ventilation, on the order of 1 ft$^2$ of vent space per 150 ft$^2$ of attic area or greater, so that another source of ventilation of the roof of a structure would not be needed.

However, the use of a filtering material such as fiberglass in the intermediate chamber 370 of the ridge cap 300 of this embodiment is not as necessary as in the embodiment 500 of Example 4C due to the provision of barriers 380 in the intermediate chamber 370 of the ridge cap 300. The barriers 380 extend downward (away from the lower surface 350 of the intermediate chamber 370) and extend axially from the longitudinal axis 340 of the ridge cap 300 toward the sides 320, 322 at an angle θ, which in one embodiment is less than 90°, and preferably is about 45°.

In one embodiment, the barriers 380 are roughly rectangular in shape and form walls within the intermediate chamber 370. The barriers are preferably approximately the same height as the walls 365 which border and help define the vents 360. A proximal end 382 of each of the barriers adjoins or at least is in proximity to a central channel 390 in the lower surface 350 of the ridge cap 300 which extends along the longitudinal axis 340 of the ridge cap 300. A distal end 384 of each of the barriers is preferably adjoining or in proximity to the intermediate chamber openings 362 of the vents 360 in order to provide a physical barrier to the entrance of dirt, water, and other unwanted elements into the intermediate chamber 370.

B. Roofing Tiles

Figure 2:
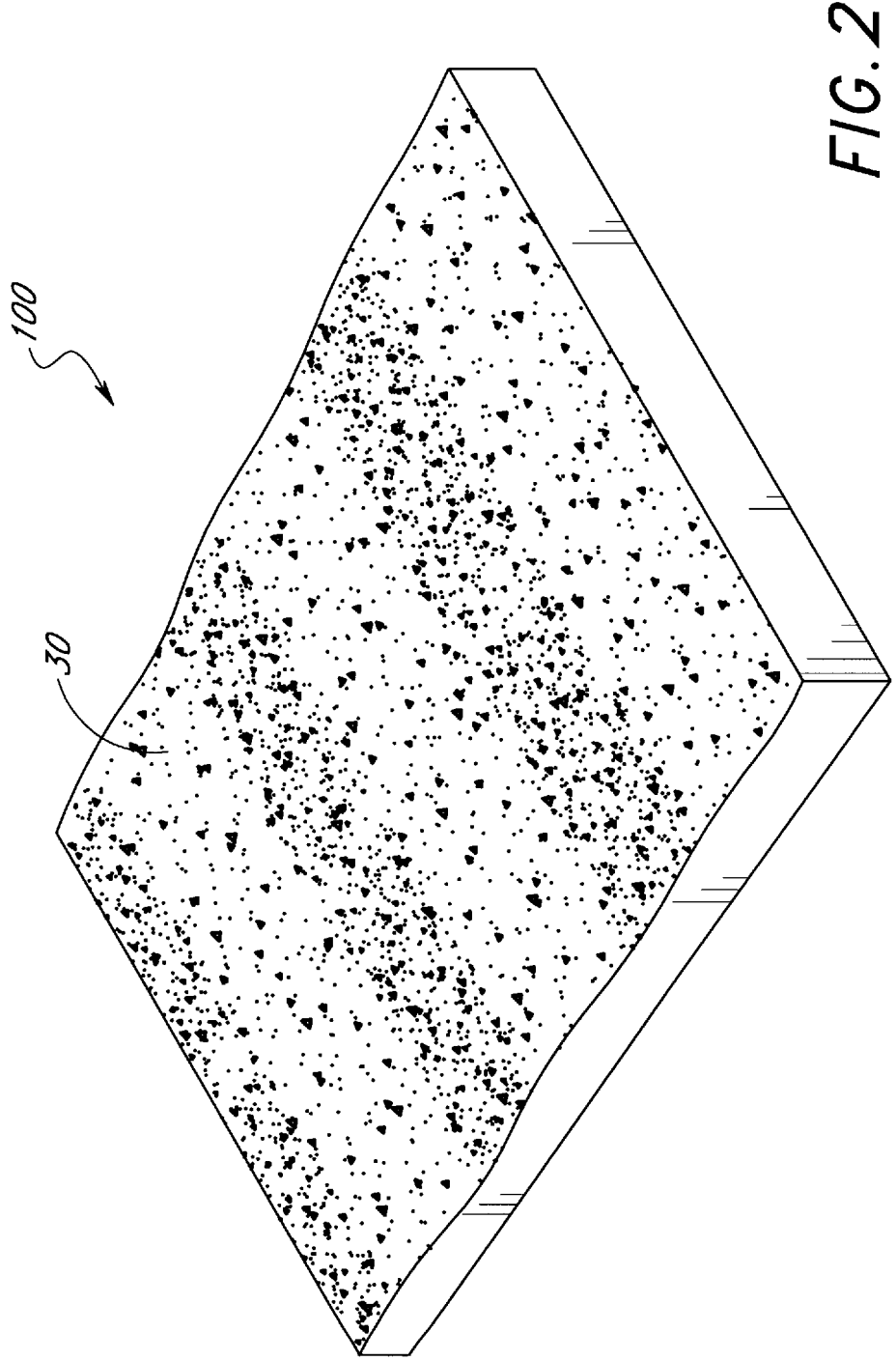
FIG. 2 illustrates a roofing tile made from the asphaltic foam material of the present invention.
Figure 3:
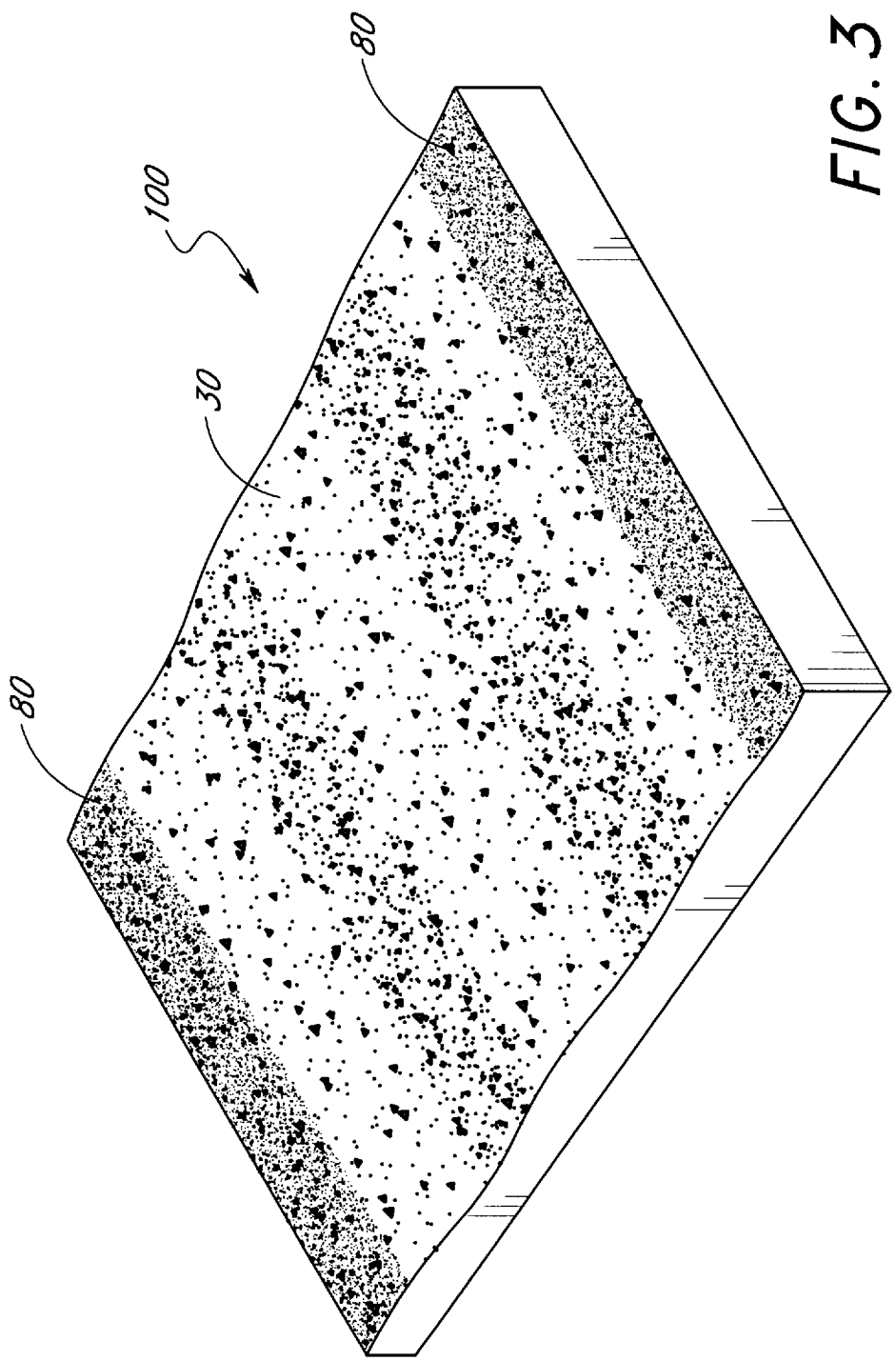
FIG. 3 shows a roofing tile similar to that of FIG. 2 but additionally having different colored granules deposited at two ends of the tile.

The asphaltic foam of the present invention is also useful in the roofing industry in producing roofing tiles 100. A roofing tile 100 as shown in FIGS. 2 and 3 having similar dimensions to the ridge cap 10 described above can be made through molding in generally the same way as the previously described ridge cap. A flat, generally rectangular surface at least 12¼" long and at least 10" wide is first chosen as the lower surface of the mold. The lower surface is preferably the surface of a conveyor belt 40.

On this conveyor belt 40 is placed a layer of roofing granules 30. These granules 30 will serve as both a protective weather layer for the roofing tile 100 and as a mold release. The granules 30 themselves are approximately 40 mesh in size. The protective layer can also be slate flake or other material capable of providing protection from the weather elements.

The layer of roofing granules 30 is preferably about ¼" deep, but can be between about ³⁄₁₆" and ½" deep. The granules 30 can be indented or impressed with any desired design, pattern, or texture. The granule surface of the final molded product will then have a design corresponding to the design which has been impressed onto the granule surface.

After placing the layer of roofing granules 30 on the moving conveyor, the reaction mixture 60 described in Example 1 is next mixed and placed on the granule layer, preferably in two strips on either side of the midline of the lower surface. A mold 70 is then placed over the reacting foam such that the foam is completely enclosed within the mold 70. The inside surface of the mold itself is preferably treated with a spray mold release, such as a silicone based mold release, or otherwise comprises a layer of PTFE, as previously described.

Tiles according to the present invention are not limited to the shapes and dimensions of the tiles shown in FIGS. 2 and 3. Due to the ease of shaping plastic articles such as the asphaltic foam articles described herein, tiles made from the present asphaltic foam can be shaped, for example, to resemble conventional shake shingles, which commonly have dimensions of roughly 12–14"×20". Alternatively, tiles according to the present invention can be shaped like Spanish-style tiles, which usually have dimensions approximating 12"×36". One of skill in the art will appreciate that tiles or shingles made from the asphaltic foam of the present invention can also be shaped in a number of other ways.

EXAMPLE 5

A continuous process for producing an asphaltic foam roofing tile 100 is as follows. In this embodiment, the upper surface of a conveyor belt 40 forms the lower surface of the mold 70. The conveyor belt 40 is preferably about 20" wide.

On the conveyor belt 40 is placed a 16" wide layer of roofing granules 30. These granules 30 are deposited on the conveyor belt 40 in a layer approximately ¼ deep. Stationary mechanical scrapers (not shown) approximately ¼" from the conveyor belt surface extending the width of the conveyor belt 40 assure a relatively even thickness of granules 30 in the granule layer by scraping and thereby leveling the granule layer 30 as it passes underneath the scrapers.

Two strips of reacting foam 60 are deposited continuously on the conveyor belt 40 on either side of the midline of the lower surface of the mold 70. The conveyor belt 40 should move just fast enough so that the extruded foam 60 is dropped on the granule surface in an amount which will result in the mold 70 being completely filled. After the reacting mixture 60 is dropped onto the conveyor belt 40, molds 70 are placed on the conveyor belt 40 in succession. The molds 70 fit against each other such that the trailing end 74 of one mold 70 (with respect to the direction in which the conveyor belt 40 is traveling) will abut the leading edge 76 of the next mold 70 on the conveyor belt 40. The molds 70 are placed over the reacting mixture one after the other continuously.

Once the final roofing tile product 100 has been formed and cured, the molds 70 are removed from the products. Consecutive roofing tiles 100 can then be separated after formation.

EXAMPLE 5A

An alternative embodiment of a roofing tile made according to the present invention is shown in FIGS. 12A–12C. In the illustrated embodiment, side 402 is approximately parallel to side 404, and side 412 is approximately parallel to side 414. However, one of skill in the art will appreciate that this configuration could be changed to produce different aesthetic effects.

This embodiment 400 makes use of the interlocking system similar to that described in Example 4A above. In this embodiment, raised members 420, 422, and 424 are sized to fit into cavities corresponding to cavities 421, 423, and 425, respectively, of another tile (not shown) whose 404 overlaps and is situated on top of side 402 of the illustrated tile 400.

Likewise, raised cavities 421, 423, and 425 of the tile 400 are sized and shaped to receive raised members on another tile (also not shown) corresponding to raised members 420, 422, and 424, respectively. This other tile, when interconnected with the illustrated tile, would overlay and lie under side 404 of the tile 400.

In a similar fashion, raised member 430 is sized to fit into a cavity on another tile (not shown) corresponding to cavity 431 of the illustrated tile 400. When raised member 430 interlocks with the cavity of another tile, the other tile lies on top of raised member 430 on side 412 of the tile 400. Cavity 431 is also sized to receive a raised member on another tile (not shown) corresponding to the raised member 430, and when interlocked with the other tile side 414 of the tile 400 overlays the other tile.

As in the embodiment of Example 4A, the present embodiment 400 can also make use of modified asphalt on the raised members 420, 422, 424, and 430 to seal these raised members to the corresponding cavities on an adjoining tile into which the raised members are inserted.

As shown in FIG. 12A, in one preferred embodiment, the raised members 420, 422, and 424 are a different size compared to raised member 430, so that tiles 400 can only be assembled in one way. The sides 402 and 404 are preferably about 36" in length, while sides 412 and 414 are preferably about 12" in length. Side 402 is also preferably ¼" high, while side 404 is preferably 1 3/16" in height.

A further feature of the tile 400 is the provision of interlocking overhangs, seen best in FIG. 12B. Overhang 440 on side 412 is adapted to fit into an overhang on a tile adjoining side 412 (not shown) corresponding to overhang 441 on the tile 400. In this embodiment, surface 444 is adapted to contact or at least come into close proximity to a surface on another tile corresponding to surface 442 of overhang 441. Likewise, surface 446 is adapted to contact or at least come into close proximity to a surface on another tile (not shown) corresponding to surface 447 of overhang 441. In addition, surface 449 is adapted to contact or at least come into close proximity to a surface on another tile (not shown) corresponding to surface 448 of overhang 441.

C. Producing Tiles and Ridge Caps with Granule Patterns

Various shape and color patterns can be produced on the granule surface of tiles, ridge caps, and other articles made according to the present invention. For example, a wave pattern can be produced on a roofing tile or ridge cap by passing a modified roller over the surface of the granules 30 prior to dropping the modified asphalt 20 or reaction mixture 60 on them. Such a roller is generally cylindrical but also has a protruding member which extends axially from the cylindrical roller. When this roller is passed over the granules 30, it will form a flat, even granule surface except where the protruding member contacts the granule layer. Where the protruding member contacts the granule layer, an indentation is formed in the granule layer. After the reaction mixture 60 is added to the granule layer, the mixture 60 will foam and fill in the indented portion of the granule layer. The final roofing tile product 100 will have a "wave" pattern as a result, as seen in FIG. 2.

Other shapes or patterns can, of course, also be impressed on the granule layer to produced granule surfaces having different designs. The granules can be indented or impressed with any desired design, pattern, or texture, which is then transferred to the foam dropped on the granules. For example, a roller comprising a cylindrical fluted roll or a cylindrical roll having a design embossed thereon can be rolled over the granule layer in order to impress a pattern on it. This pattern will be retained in the final foam product as long as the foam does not disturb the pattern when it is laid on the granule layer.

The roofing granules 30 can also be colored or shaded in order to produce a desired aesthetic effect in the final molded product. For example, blended colored roofing granules 30 can be dropped onto a moving conveyor belt 40. Alternatively, roofing granules 30 of a single color or a mixture of colors can be deposited on the surface of such a conveyor belt 40, after which granules 30 of a different single color or mixture of colors are dropped onto the surface. In this way, a desired pattern can be produced on the surface of the final molded article through the use of such different colored granules 30. Through the use of granules of at least two colors or two shades of a single color, a shadowing effect can be produced in the final ridge cap product.

In one embodiment, several discharge holding tanks, each holding different color granules, or a single discharge holding tank holding different color granules in different compartments, are used. As a conveyor belt underneath the holding tanks moves by, granules of a first color will be deposited on the conveyor belt for a predetermined amount of time from a first gate in order to cover a predetermined portion of the surface of a tile, ridge cap, or other article with granules of the first color. Of course, the first or succeeding color granules can also comprise a mixture of colors of granules.

After the first color granules are deposited on the conveyor belt, granules of a second color are deposited on the conveyor belt from a second gate for a predetermined period of time. Following this, granules of a third or succeeding color can be deposited on the conveyor belt, or granules of the first color can again be deposited. In this way, vertical bands of granules of different colors can be formed in the tiles, ridge caps, or other articles formed by this method.

Alternatively, horizontal bands of color can be formed on a tile, ridge cap, or other article by placing the opening of a discharge tank holding granules of a first color side by side with the opening of a discharge tank holding granules of a second color. The openings should, of course, together be only as wide as the conveyor belt surface.

EXAMPLE 6

The roofing tile 100 of Example 5 can be produced with decorative patterns of granules 30 in which the granules 30 have different colors. Granules 30 having a darker color are first dropped onto the surface of the conveyor belt 40 over a short portion of the conveyor belt 40 (on the order of 1–3 inches) to form a dark band 80. Granules 30 having a lighter color are then dropped on the conveyor belt 40 over a length of 6–10 inches, after which darker granules 30 are again dropped onto the belt, forming a second dark band 80. A roofing tile 100 is then produced as described in Example 5. The product of this process is depicted in FIG. 3.

IV. Conclusion

Although the present invention has been described herein in terms of certain preferred embodiments, these embodiments are illustrative only and do not limit scope of the present invention. Thus, those of skill in the art will appreciate that there are other ways of making and using the present invention besides those explicitly described herein which fall within the scope of this invention. The references referred to herein are, in addition, hereby incorporated by reference.

What we claim is:

1. A ridge cap having a lower surface adapted to be placed in contact with a roof of a building and an upper surface, said upper surface having granules embedded therein, said ridge cap further comprising:
   a longitudinal axis having a front end and a back end, wherein said ridge cap further comprises at least two sides located axially distal of said longitudinal axis; and
   an elastomeric strip along said longitudinal axis, said elastomeric strip and said sides being of unitary construction, said sides being of a different material than said elastomeric strip, said material of said sides being more rigid than the material of said elastomeric strip.

2. The ridge cap of claim 1, further comprising a central channel in said lower surface located along said longitudinal axis.

3. The ridge cap of claim 1, further comprising a plurality of vents, wherein the outlet ends of said vents are located in at least one of said two sides, and wherein each of said plurality of vents extends axially inward toward said longitudinal axis.

4. The ridge cap of claim 3, wherein at least one of said vents further comprises a central channel opening, wherein said opening provides communication between said central channel and said one of said vents.

5. The ridge cap of claim 3, further comprising an intermediate chamber in said lower surface adjacent said central channel, wherein at least one of said vents further comprises an intermediate chamber opening, said opening providing communication between said intermediate chamber and said at least one of said vents.

6. The ridge cap of claim 5, wherein said intermediate chamber further comprises one or more barriers, each of said barriers comprising a proximal end in proximity to said central channel and a distal end adjacent to said intermediate chamber opening of each of said at least one of said vents.

7. The ridge cap of claim 6, wherein each of said one or more barriers comprises a wall extending from said lower surface of said ridge cap.

8. The ridge cap of claim 3, wherein at least one of said plurality of vents comprises a segment which extends at an angle with respect to another segment of said vent.

9. The ridge cap of claim 8, wherein said angle is approximately 30°.

10. The ridge cap of claim 1, wherein said upper surface of said front end further comprises a raised member having a first surface, said lower surface of said back end comprising a cavity having a second surface, wherein said first surface of said raised member is adapted to be able to contact or be placed in proximity to a said second surface of a cavity of a second ridge cap, said raised member of said ridge cap thereby cooperating with said cavity of said second ridge cap to interconnect said ridge cap with a second ridge cap.

11. The ridge cap of claim 10, wherein modified asphalt is placed in contact with or adjacent to said first surface of said raised member.

12. A ridge cap having a lower surface adapted to be placed in contact with a roof of a building and an upper surface, said ridge cap further comprising:
   a longitudinal axis having a front end and a back end, wherein said ridge cap further comprises at least two sides located axially distal of said longitudinal axis; and
   a central channel in said lower surface located along said longitudinal axis, wherein a protruding member extends from a first surface of said central channel, and wherein a second surface of said central channel comprises a notch adapted to receive said protruding member, said protruding member and notch being adapted to cooperate so as to at least substantially block said central channel when said ridge cap is bent and a distal end of said protruding member is thereby made to enter into said notch.

13. The ridge cap of claim 12, wherein said protruding member and notch are located at said back end of said ridge cap.

14. The ridge cap of claim 12, wherein said protruding member and notch are located intermediate said front end and said back end of said ridge cap.

15. The ridge cap of claim 12, additionally comprising a second notch and a second protruding member, wherein said second protruding member and second notch are adapted to cooperate so as to at least substantially block said central channel when said ridge cap is bent and a distal end of said second protruding member is thereby made to enter into said second notch.

16. The ridge cap of claim 12, further comprising a plurality of vents, wherein the outlet ends of said vents are located in at least one of said two sides, and wherein each of said plurality of vents extends axially inward toward said longitudinal axis.

* * * * *